United States Patent [19]

Fuller et al.

[11] Patent Number: 4,843,377
[45] Date of Patent: Jun. 27, 1989

[54] REMOTE CONFINEMENT SYSTEM

[75] Inventors: Kip L. Fuller, Denver, Colo.; Donald W. Collier, Chicago, Ill.

[73] Assignee: Guardian Technologies, Inc., Cincinnati, Ohio

[21] Appl. No.: 41,698

[22] Filed: Apr. 21, 1987

[51] Int. Cl.⁴ .................. G08B 23/00; A61B 5/08; H04N 7/18; G06K 9/00
[52] U.S. Cl. .................. 340/573; 128/719; 358/108; 379/38; 381/42; 382/4
[58] Field of Search .......... 340/573, 576, 539, 825.49; 180/272; 379/38, 40; 381/42; 382/3-4; 358/105, 108; 128/719, 632, 637; 40/21 C

[56] References Cited

U.S. PATENT DOCUMENTS

| | | | |
|---|---|---|---|
| 3,478,344 | 11/1969 | Schwitzgebel et al. | 340/539 X |
| 3,525,811 | 8/1970 | Trice et al. | 381/42 |
| 3,752,904 | 8/1973 | Waterbury | 358/84 |
| 3,764,270 | 10/1973 | Collier et al. | 128/719 X |
| 3,809,067 | 5/1974 | Hoppesch | 340/576 X |
| 3,842,345 | 10/1974 | Padgitt et al. | 324/71.1 |
| 3,873,771 | 3/1975 | Kleinerman et al. | 370/11 |
| 3,903,726 | 9/1975 | Hirosawa et al. | 73/23 |
| 3,983,535 | 9/1976 | Herbst et al. | 382/3 |
| 3,989,896 | 11/1976 | Reitboeck | 381/42 X |
| 4,093,945 | 6/1978 | Collier et al. | 340/52 R X |
| 4,136,338 | 1/1979 | Antenore | 340/551 |
| 4,285,146 | 8/1981 | Charles et al. | 40/21 C |
| 4,549,044 | 10/1985 | Durham | 379/40 |
| 4,558,181 | 12/1985 | Blanchard et al. | 379/40 |
| 4,578,539 | 3/1986 | Townsing | 379/97 |
| 4,593,273 | 6/1986 | Narcisse | 340/539 |
| 4,598,275 | 7/1986 | Ross et al. | 340/573 |
| 4,613,845 | 9/1986 | Du Bois | 340/52 R |
| 4,665,385 | 5/1987 | Henderson | 340/539 |
| 4,670,781 | 6/1987 | Aubert et al. | 358/93 |
| 4,675,656 | 6/1987 | Narcisse | 340/539 |
| 4,691,340 | 9/1987 | Maeda et al. | 379/96 |
| 4,706,689 | 11/1987 | Man | 340/539 X |
| 4,715,059 | 12/1987 | Cooper-Hart et al. | 379/53 |
| 4,738,333 | 4/1988 | Collier et al. | 340/576 X |
| 4,747,120 | 5/1988 | Foley | 379/38 |

FOREIGN PATENT DOCUMENTS

| | | |
|---|---|---|
| 122888 | 10/1984 | European Pat. Off. |
| 212947 | 3/1987 | European Pat. Off. |
| 2818955 | 4/1978 | Fed. Rep. of Germany |
| 850152 | 4/1985 | World Int. Prop. O. |
| 8707723 | 12/1987 | World Int. Prop. O. |

OTHER PUBLICATIONS

A. K. Schmidt, "Electronic Monitoring Equipment", NIJ Reports, Feb. 28, 1986.

Primary Examiner—Glen R. Swann, III
Assistant Examiner—Thomas J. Mullen, Jr.
Attorney, Agent, or Firm—Wood, Herron & Evans

[57] ABSTRACT

A remote confinement or home arrest system and method which provides for determining from a central office the presence of a prisoner at an assigned remote location such as the prisoner's home and for determining the compliance by the prisoner with behavioral restrictions associated with the confinement such as the abstinence from alcohol or other drugs. The system includes a tester such as a breath alcohol tester or other body fluid tester for determining the effect of substance abuse by the prisoner and for simultaneously verifying the identity of the prisoner and the fact that the test information originated from the identified prisoner. Pictorial, voice print and other means for identifying the prisoner are contemplated.

216 Claims, 3 Drawing Sheets

REMOTE CONFINEMENT SYSTEM

FIELD OF THE INVENTION

The present invention relates to the alternative confinement and personal surveillance systems for prisoners, probationers and the like, which are often referred to as "home arrest", "home incarceration" or "remote confinement" systems. More particularly, the present invention relates to such systems requiring verification of the prisoner's presence at an unsupervised place of confinement or detention and verification of the prisoner's compliance with additional conditions and behavioral restrictions associated with the confinement.

BACKGROUND OF THE INVENTION

The concept of remote confinement has attracted a great deal of public interest in recent years as an aid for probation and as an alternative to prison, jail or other institutional confinement for certain classes of criminal offenders. Home incarceration and remote confinement as used herein refer to confinement to one's home or to another location usually remote from a conventional prison or other correctional facility for service of a criminal sentence or probation. The overcrowding of jails and prisons, and the high costs of the construction and operation of prison facilities, have made necessary the search for alternatives to institutional incarceration, particularly for non-violent offenders.

The increase in numbers of the persons convicted of criminal offenses requiring incarceration or supervised probation is due in part to the demand for the imposition of sentences for crimes involving substance abuse. A number of those convicted requiring such sentences are convicted for the offenses involving drug and alcohol usage, and particularly, for the offense of driving under the influence of alcohol, drugs, or other such substances ("DUI").

Until recently, the only practical means for implementing the imposition of incarceration as a penalty for these offenses has been to require confinement in the available jails and prisons. These penal institutions, however, are generally designed to accommodate prisoners convicted of crimes ranging widely from the most violent and most dangerous of offenses to those which, in a relative sense, are committed by those who constitute less of a threat to the public safety. Accordingly, the conditions of incarceration and the facilities necessary to incarcerate persons convicted of different crimes need not conform to the same requirements for all prisoners. For this reason, the concept of home incarceration has been looked to as a useful alternative tool to make criminal confinement for less egregious offenses possible without unduly crowding or otherwise burdening a prison system having facilities designed to accommodate the requirements for housing more dangerous offenders.

In addition, for certain types of offenders, particularly first time offenders, the likelihood of rehabilitation and return to normal life is increased by the use of the home incarceration in lieu of prison confinement. Home incarceration permits offenders to continue the care and support of their families, to maintain employment, and to pay fines and compensate their victims. Home incarceration also is particularly useful in special programs such as early release and work release, for defendants awaiting trial, for release on or in lieu of bond, and in other cases where detention is desirable but less than absolute maximum security is required.

The initial problem confronted in the use of remote confinement is the problem of verifying the presence of the prisoner at the designated confinement location. Continuous human surveillance of a number of geographically dispersed remote confinement locations is not feasible since the manpower involved and its related cost would likely offset or exceed the potential cost savings that remote confinement otherwise offers over the use of prisons. An honor system, even one with periodic checking by corrections officers, would also be costly and would suffer from unacceptable low security in many cases. Some form of involuntary confinement is considered by many to be a minimum requirement for detention which serves a punishment for crime.

A solution to the problem of verifying the presence of the prisoner at the remote confinement location has been developed in the prior art. Systems presently in use employ a bracelet or anklet device locked about the prisoner's neck, wrist or ankle which operates together with a device installed on the prisoner's telephone to verify the prisoner's confinement by telephone surveillance over telephone lines from a central office such as the probation office of the criminal justice facility. Such systems in current use are those manufactured or marketed by BI Incorporated of Boulder, Colorado, by Community Control Corp. of Fort Lauderdale, Fla., and by Behavioral Systems Southwest, Inc. of Panoma, Calif.

These prior art systems work in two ways. First, they may cause the phone at the prisoner's home to automatically report to a central office whenever the prisoner strays more than a specified distance, usually about 150 feet, from the phone. Second, the system may report the presence or absence of the prisoner upon interrogation by the central office. Some devices include an RF transmitter in a neck band, bracelet or anklet which emits a constant or pulsed signal which is received by a transponder connected to the phone line in the prisoner's home; when the signal sensed by the transponder drops below a predetermined level due to the prisoner's excessive distance from the phone, the transponder dials the central office. With other systems, the transponder is activated when contacted by a phone call from the central office and, at that time, verifies the presence of the prisoner as determined by the presence or absence of a signal from the transmitter. Other systems require a physical contact or the generation of an electronic signal between the bracelet or anklet and the phone set to be initialized by the prisoner in response to a call from the central office. For verification of the presence of the prisoner to occur with such a system, it is necessary for the prisoner to be present within some predetermined radius of the telephone location. Absence of the prisoner from this radius will cause a signal to be received by the corrections office informing it of a violation of the home arrest confinement. Many of such systems have the disadvantage of being capable of circumvention by the generation of false signals from a device other than that which is attached to the prisoner.

It is also known in the prior art to use video cameras to survey over dedicated lines the area of a prisoner's incarceration. Such devices are an extension of the art of electronic visual surveillance employed in the security of industrial, retail and financial establishments as well as in the periphery security of apartment buildings and other commercial and residential facilities. The cameras of these systems are used either on-line or with recording devices. Such systems, when used on-line, require a human attendant to monitor the visual images and to make decisions based on what is viewed. An attendant at the central office is not essential in the prior art systems described previously, however, and such systems would lend themselves more readily to a more automated and less supervised decision making process.

All these prior art systems, however, lack the capability of testing for past compliance of the prisoner with behavioral restrictions such as abstinence from drugs such as alcohol. In addition to verifying the mere presence of the prisoner at the place of confinement, the need for determining the prisoner's compliance with the behavioral conditions is of major importance. The inability of the prior art systems to effectively determine such compliance seriously limits their effectiveness as alternatives to institutional incarceration.

Since a principal need for the remote confinement concept is for the incarceration of abusers of chemical substances such as drugs and alcohol, an important condition of the incarceration is frequently the requirement that the prisoner abstain from the consumption of drugs or alcohol while incarcerated.

Alcohol usage is often of great concern to probation officials. This is due not only to the fact that many of the offenders for which home incarceration is well suited are those having a history of alcohol abuse, but it is also because the home incarceration concept itself results in a state of boredom and inactivity which precipitates alcohol abuse.

Alcohol and drugs are often readily available to the prisoner incarcerated at home. Such being the case, substance abuse is a problem for the entire family as well as the prisoner. The likelihood of domestic violence and erratic behavior is greatly increased by substance abuse. Drinking diminishes the ability of the offender to make rational decisions about complying with judicially imposed conditions so that violence or attempts to flee from the place of confinement as well as other offenses which would not be as likely to occur when the prisoner is sober are liable to be committed when a prisoner is under the influence of alcohol or some other drug.

The prior art systems have lacked the ability to determine the compliance with or violation of conditions or restrictions on the remotely confined person's behavior, including behavior relating the abuse of restricted substances, or to determine conduct such as the use of device for generating false signals to defeat the home incarceration system. These have been among the shortcomings of the prior art.

Accordingly, the absence of an effective means to determine the remotely incarcerated prisoner's behavior in connection with the use of substances such as alcohol and drugs during the course of the incarceration has been a material drawback to the remote incarceration alternatives of the prior art. There exists a need for a remote confinement system overcoming the shortcomings of the prior art discussed above.

SUMMARY OF THE INVENTION

In view of the foregoing, it is a principal objective of the present invention to provide a remote confinement system which provides the capability of not only verifying the presence of the prisoner at the home or at any other remote confinement location to which the person is to be confined at any particular time, but which also provides means for remotely determining compliance by the prisoner with behavioral conditions in addition to that of confinement itself. More particularly, it is an objective of the present invention to provide such a remote confinement system with the capability for remote determination of compliance by the prisoner with restrictions on the use of drugs, particularly, alcohol.

Furthermore, it is an additional objective of the present invention to provide a remote confinement system which allows for a minimum amount of equipment at the central office facilities and central office staff in order to utilize the remote confinement alternative for a large number of prisoners. It is a more specific objective of the present invention to provide a system which will accommodate a maximum amount of automated decision making, a minimum amount of manual monitoring, and the ability to adapt to and utilize a wide variety of the technological advances in remote monitoring equipment, and in information transmission, analysis and processing, which have been recently perfected, are in the process of development, or which may hereinafter be developed or reduced to a more economical and efficient form to be added to or to replace the components of systems which have been deployed.

According to the principles of the present invention, a remote confinement system is provided with means for establishing a communications link between a central office and a remote confinement location, preferably a selected one of many such locations, at which a prisoner is confined. The system includes means at the remote confinement location for the unsupervised extracting of information from a person at the location for identifying the person as the designated prisoner and for determining the presence of evidence of a violation of a behavioral condition by the person so identified. The system provides for the communication to the central office of information to verify the prisoner's presence at the remote confinement location and the prisoner's compliance with the behavioral condition.

In order to accomplish its objectives, the present invention provides at the remote confinement location a capability for performing tests for the prisoner's compliance with specific behavioral conditions. In contrast to prior art on-line surveillance systems, where this has been accomplished by constantly monitoring or recording the prisoner's observable behavior for immediate video transmission of a violation, the system of the present invention accomplishes its objectives by performing a test or sampling procedure intermittently to detect the results or lingering effects of a violation which has previously occurred or has occurred outside of a sphere of surveillance. The present invention makes use of the fact that in the case of alcohol consumption, for example, as in cases of other drug use, a number of body fluid tests or other tests taken on or in the vicinity of the prisoner are employable to detect a violation by the prisoner. Blood tests for example are effective to detect most types of substance abuse. Blood alcohol content (BAC) can be reliably and economically determine through breath testing. Urinalysis also is effective for the detection of many abusable substances. Saliva testing has been found to be useful in testing for abuses of some substances also.

In order to test for the conditions of violations in a remote confinement system, the present invention provides the capability for the testing at the remote confinement location without on-site supervision and provides for the communication of the test data or test results from the remote location to a central location where information from the test can be processed to arrive at a decision as to whether or not there has been a violation of the behavioral conditions by the prisoner. To accomplish this, the present invention provides for the reduction of the test data to a test result, and for determining from the result the existence of a violation. The data reduction and determination is made either at the incarceration location or at the central office, and either automatically or in part with operator assistance.

Furthermore, according to additional principles of the present invention, a remote confinement system is provided with the means for assuring that the data from the test is indeed associated with the specific remotely confined prisoner. In the case of the sobriety testing of the prisoner, for example, where a breath test or other body fluid test is to be remotely taken, the identity of the person whose breath is being tested must be verified as that of the intended prisoner. Otherwise, either alone or with the cooperation of a friend or family member, the purpose of the test for compliance with behavioral conditions could be defeated.

The present invention further provides a remote confinement system which is flexible, economical and efficient. It does so in part by allowing for a minimum of central office supervision, monitoring, and manual decision making. As a result, the remote confinement system of the present invention allows for a minimum amount of equipment at the central office facilities and a minimum of central office staff to accommodate a large number of remotely confined prisoners. Importantly, the present invention also provides a system which will accommodate a maximum amount of automated decision making, a minimum amount of manual monitoring, and the ability to adapt to and utilize a wide variety of the technological advances in remote monitoring equipment, and in information transmission, analysis and processing, which have been recently perfected, are in the process of development, or which may hereinafter be developed or reduced to a more economical and efficient form so that these advances may be added to or may replace the components of systems which have been deployed.

The present invention specifically provides a remote confinement system in which a signal is derived at a remote confinement location which contains information for determining the presence and identity of the specified prisoner at the location. The invention further provides for deriving information at the remote confinement location from which determination of compliance with the prisoner's conditions of confinement can be made. The system of the invention further provides for verifying that the source of the information regarding compliance is information relating to the conduct of the person whose presence and identity were determined.

The system includes a communications link from the remote confinement location to a central monitoring station such as a parole office, and provides for presenting at the central location the information from which the results of the attendance and behavioral tests can be determined.

These and other inventive concepts are set forth in the described embodiments of the invention which set forth home incarceration systems for determining the attendance of the prisoner at the remote confinement location as well as the prisoner's compliance with behavioral conditions such as restrictions on the use of substances such as alcohol or other drugs by the prisoner.

DETAILED DESCRIPTION OF THE INVENTION

Figure 1:
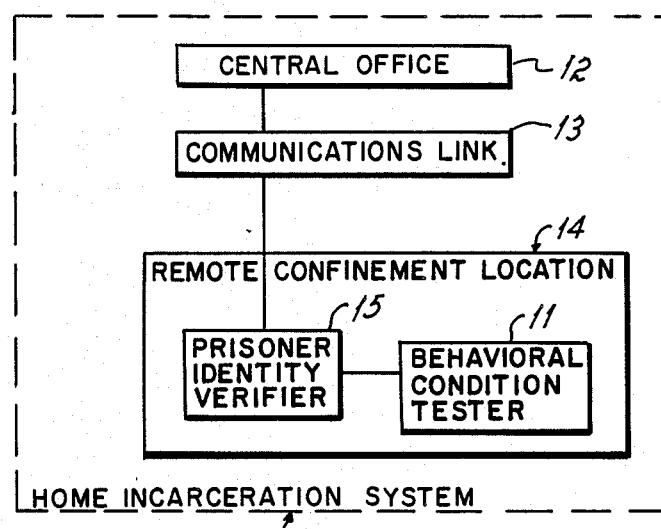
FIG. 1 is a block diagram of a remote confinement system according to principles of the present invention.

The remote confinement system of the present invention can best be appreciated by reference first to FIG. 1 which illustrates diagrammatically the general configuration employed by the specific embodiments described below. FIG. 1 shows a remote confinement system 10 which is provided with a behavioral condition tester 11 which is capable of detecting the lingering effects of a behavioral condition violation by the remotely confined prisoner and communicating the information to a central office 12. A communications link 13 which connects the central office 12 with a remote confinement location 14 at which the prisoner is located communicates the test information to the central office 12. The behavioral condition tester 11 is located at the remote confinement location 14 along with means 15 for extracting information for verifying the identity of the person tested by the tester 11 as that of the designated prisoner.

According to the present invention, identity confirming information of a person at the confinement location 14 is transmitted to a central monitoring location 12 through the communications link 13. In addition, behavioral condition compliance information is extracted from the person at the confinement location 14 by the tester 11 and is also transmitted to the central location 12 through the communications link 13. The system 10 of the present invention presents this information at the central office 12 for evaluation and for verification of the presence of the prisoner at the remote confinement location 14 and for determination of the identified prisoner's compliance with the behavioral condition associated with his order of confinement.

The identity confirming information, in accordance with the present invention, is information having a high probability of being uniquely associated with the particular prisoner. The prior art home arrest systems have employed only an artificial signal source attached to the prisoner in the form of a bracelet or anklet which, on cue or otherwise, is made to transmit an identification signal unique to a particular prisoner. Some of the embodiments of the present invention employ as the prisoner identity verifier 15 such identity confirming means in a manner uniquely combined with other features of this invention.

Other embodiments of the present invention employ identity confirmation by interpretation of information which is intrinsic to the prisoner. This is achieved with the use of an identity verifier 15 such as pictorial camera which develops visual image information which may be transmitted over the communications link 13, particularly over voice quality telephone lines, to present a visual image of the prisoner at the central office 12. Alternative embodiments employ voice information which may be transmitted to the central office 12 as a characteristic voice print unique to the prisoner. Fingerprint information is also an acceptable form of intrinsic information which may be transmitted to the central office as an unique and positive identification characteristic of the prisoner. Chemical or biological information from blood or other body fluids or tissue can also provide means for effective identification of specific prisoners. Still, other intrinsic human characteristics such as unique ocular patterns of the fundus of the eye retina are adaptable to the identity verifying means 15.

Still, other embodiments of the invention employ a category of identity confirming information which is learned by the prisoner. The learned information may be a unique skill or statement taught specifically for the purpose of the home incarceration identification, or may be information from the knowledge, skills and experience previously learned by the prisoner and difficult to duplicate by others. Handwriting, for example, is a product of an acquired skill and is different for each individual. The differences provide the capability of personal identification by experts and, in addition, by recently developed equipment which can distinguish among sources automatically.

In some embodiments, an identifying comparison is made automatically at the home location in the equipment 15 there provided, and in others information is transmitted to the central office 12 where comparison with information in the central office data files is made, either automatically or with the aid of an operator.

Most of the described embodiments of the present invention are presented in the context of the system which employs a behavioral condition tester 11 to measure the blood alcohol content of the prisoner to determine compliance with a confinement condition restricting the consumption of alcohol by the prisoner. In most of these embodiments, the test is made in the form of a breath test or other test of body fluid delivered by the prisoner into the tester 11.

Other tests, particularly those for analyzing body fluids such as blood, urine and saliva, are capable of being performed by automated equipment included in the tester 11. Tests of these fluids for specific substances can be performed without supervision at a remote confinement location 14. Techniques for testing a fluid with a specific reagent, for example, are available for testing for many drugs. Such techniques result in visually perceivable reaction results which can be transmitted by picture from the remote location 14 to the central office 12. Other techniques are capable of producing test results or data in the form of an electrical signal which is readily transmitted from the remote location 14 to the central office 12 where it can be automatically interpreted. These adaptations are contemplated by the present invention.

Certain embodiments of the present invention include the additional steps or means for verification that the breath test or other test or sampling from the tester 11 that is employed to determine compliance with the behavioral condition is in fact a test or sample related to the prisoner whose identity is confirmed by the identity verifier 15 in the system 10. This verification of the source of the test data is achieved by using an interrelated identity confirming and condition sampling method to insure that two bodies of information are derived from the same human source. This is accomplished in some of those embodiments which employ video or pictorial information to verify the prisoner's identity, for example, by reading or recording the visually perceivable readout of the breath test or other condition sampling operation in the same picture used to confirm the prisoner's identity. In alternative embodiments in which voice identification is used, for example, the source verification is accomplished by using a dual purpose sampling device for obtaining breath and voice samples in such a way that the samples are obtained sufficiently close in time or place so that they are assured of being derived from the same human source. Further, in other alternatives, the same dual testing or sampling device is employed, such as by obtaining from the prisoner's finger substantially contemporaneously, a fingerprint for identification purposes and a blood test for sampling blood chemistry for behavioral condition compliance. Additionally, it is contemplated that technological refinements will continue to produce more compact and economical automated devices which will enable the sampling of blood and other tests for substance abuse, and to further facilitate the derivation of information from the tests in an economical manner, and that advances will continue to produce more compact and economical devices to enable identification of the person who is the source of a bodily fluid or other test performed automatically. Accordingly, certain embodiments of the invention further contemplate the utilization of a single prisoner test or sample which contains both identity confirming information and confinement condition compliance information, as for example from a sample of blood.

With certain of the embodiments of the invention, a transmission link 13 is provided from a central office to the various confinement locations 14. Such a link may utilize any of a number of the various available communications networks. The public telephone system is utilized in many of the preferred embodiments described herein. The video cable systems as well as air wave links are also contemplated and may be desirable in certain embodiments and adaptations of the invention. With the various systems, information may be transmitted from the remote confinement location 14, where it is derived from the prisoner by the particular sampling method, to the central location 12 where it is processed and where a decision is made. In the alternative, the information may be automatically processed by various devices or circuitry at the remote confinement location 14 and the results of the comparison only transmitted to the central office 12.

The embodiments which employ detection logic and comparison logic at the remote confinement location 14 can make greater use of lower quality transmission means by reducing the information content in the signal being transmitted to the central office 12. This feature is most useful and helpful when voice quality phone lines are used. At the other extreme, high information content signals as ar accommodated by coaxial cable networks are useful for the rapid transmission of a large amount of raw data from the remote confinement locations 14 to the central office 12 for processing centrally in a large computer. These latter embodiments, where proposed, minimize the electronics processing equipment necessary at each of the remote confinement locations, a worthwhile objective when a large number of confinement locations 14 must be serviced.

Implicit in the requirement that the identity of the person at the remote confinement location be confirmed is the need to assure that the test is in fact being performed at the given confinement address. This requires that equipment be located at or otherwise associated with the specific remote location so that the location be uniquely identified. This may be done by installing coded answering devices or other uniquely self-identifiable fixed equipment at each remote location 14, or by utilizing a telephone communications switching network for the link 13. The telephone switching network must be made to reliably establish a communications link to the specified confinement location 14. While location confirmation can be assured with dedicated lines from the central office 12 to the confinement location 14, the embodiments of the present invention which are described herein employ selectable networks such as the standard telephone switching network to address specific locations. The standard telephone switching network is determinative of the level of confidence in confirming the location of the test being performed. It is contemplated that adequate administrative steps are taken to assure the desired level of reliability by preventing the use of call forwarding and other such features.

Selectability can be achieved with telephone system by random dialing of programmed phone numbers. Selectability can also be controlled by a computer at the central office 12 to select different locations 14 at different times according to a program, thus accommodating a limited confinement schedule of a prisoner, or accommodating a sentence which allows confinement at more than one location, such as at work and at home at different predetermined times of the day.

The equipment provided at the confinement location 14, however, is capable of being geographically fixed and, if provided with equipment identifying coding devices, will furnish a means for location verification where non-selective communication links are employed. Certain embodiments of the present invention may utilize this in connection with the cable or air wave communication from the central office 12 to the confinement location 14, or to verify telephone link communications. With such systems, the equipment of each remote location 14 may be made to respond to a unique calling code.

The preferred embodiments of the present invention, as well as the objects and the advantages discussed above and others which will be more readily apparent from the description below.

FIRST PREFERRED EMBODIMENT

Figure 2:
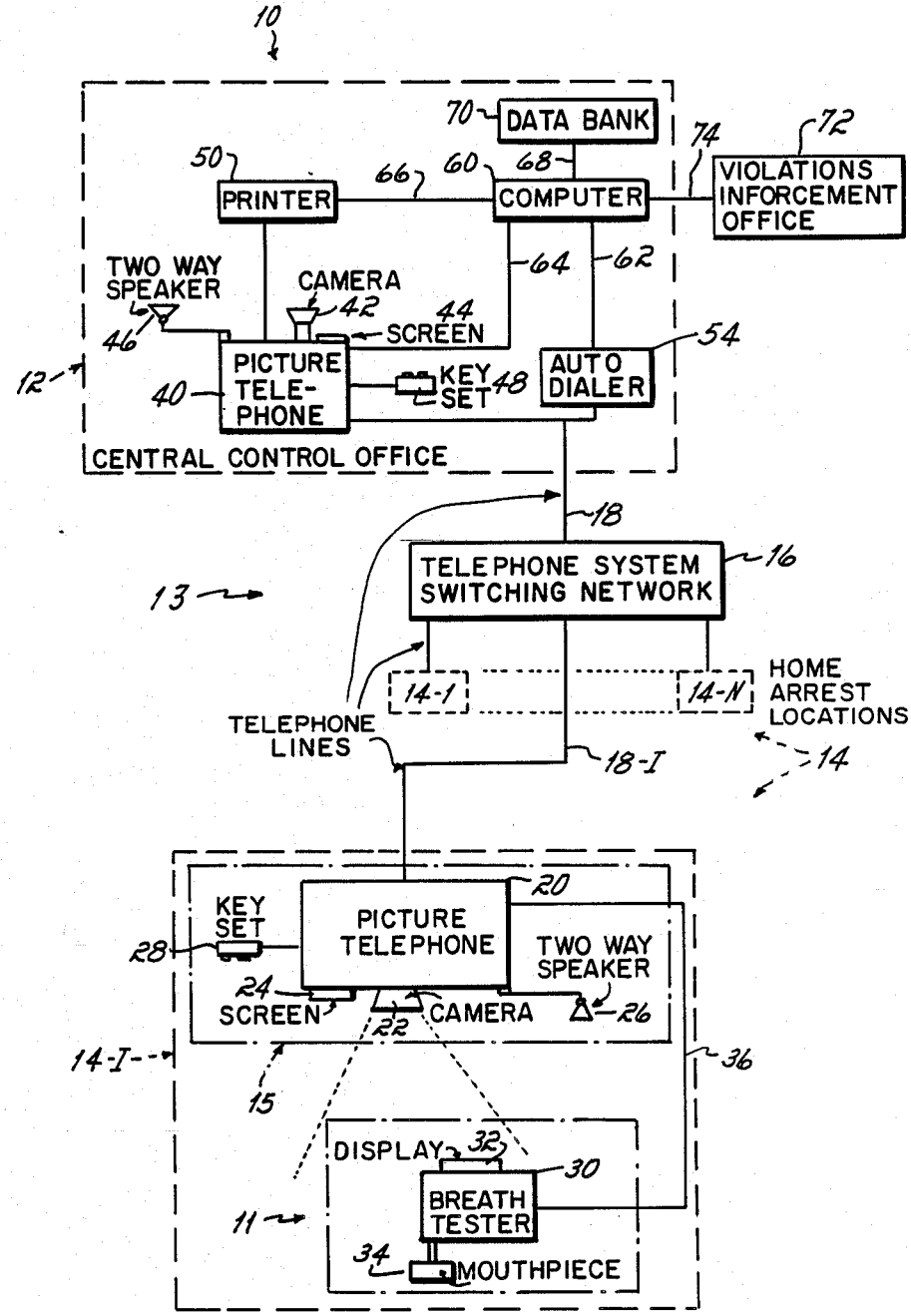
FIG. 2 is a block diagram of a first preferred embodiment of a remote confinement system as shown in FIG. 1 in accordance with additional principles of the present invention.

In FIG. 2, the first preferred embodiment of the present invention is diagrammatically illustrated. In this embodiment, a home incarceration or remote confinement system 10 includes a central office 12 and plurality of remote incarceration locations 14. The central office 12 is, for example, a communications center at the probation office or correctional facility. The remote confinement locations 14 may be residences of persons under home confinement or may be their work places or other locations at which their freedom of movement is to be restricted. The confinement locations 14 are illustrated as 14-1 through 14-N in FIG. 2.

Each of the locations 14-I (referred to hereinafter as 14) is selectively connectable to the central office 12 through a conventional telephone system 16 by telephone lines 18 thereby establishing a selective communications link 13 between central office 12 and each of the confinement locations 14. In this embodiment, all communications occur over telephone lines 18 which are of standard voice quality.

In this embodiment, each of the home incarceration locations 14 is provided with a prisoner identity verifier 15 which is made up of a freeze frame picture telephone 20. The picture telephone 20 is directly wired to the voice quality telephone line 18 connecting that confinement location 14 to the telephone system exchange 16. The picture telephone 20 may be any device capable of transmitting pictorial information from the confinement location 14 over the telephone lines 18. Devices which transmit still pictorial images at a rate of one every few seconds are suitable for this application. One such device is commercially available, for example, under the trade name Luma Video Telephone manufactured by Luma Telecom of California, a subsidiary of Mitsubishi Industries. This device include a camera 22 which is capable of collecting pictorial information in the form of one still image every two or three seconds. This picture telephone 20 in its commercially available form also has a video display screen 24 which will display the images received over the phone lines 18. However, in this application, the screen 24 of the picture telephone 20 is not necessary at the remote confinement location 14. The picture telephone device 20 also includes a two-way audio speaker 26 which functions provide two-way audio communications in the same manner as a telephone handset or a speaker phone. The picture telephone 20 also includes a touch tone key set 28 which functions as does the key set of a conventional touch tone telephone; it also includes other push button control functions.

In the embodiment of FIG. 2, the remote confinement location 14 is also provided with a behavioral condition tester 11 in the form of a breath tester 30 which is capable of measuring the blood alcohol content ("BAC") of a prisoner or probationer confined to the confinement location 14. The breath tester 30 includes either an analog meter or digital display 32 for visually displaying the result of the test in a visually perceivable form which can be read by the camera 22. The camera 22 forms a still picture image of the readout of the display 32 for transfer over the phone lines 18 in a form capable of being perceived and interpreted at the central office 12. To provide this, the breath tester 30 in this embodiment is equipped with visual display 32 which is large enough and clear enough to be resolvable in a picture transmitted by the particular picture telephone device 20 which is employed.

The breath tester 30 is equipped with a mouthpiece 34 adapted to receive a breath sample from the prisoner. The breath tester 30 operates such that, when the breath sample is blown by the prisoner into the mouthpiece 34, a BAC reading is produced on the display 32. An image of the display 32 is recorded by the camera 22 and transmitted by the picture phone 20 over the phone lines 18 to the central office 12. The identity of the person providing the breath sample can then be determined by an attendant at the central office 12. In addition, by listening to the sound picked up by the speaker 26, an attendant at the central office 12 can further confirm that the breath sample is being given at the same time as the picture image is being formed.

Breath testers suitable for use as the breath testing device 30 are commercially available. One such device is, for example, the Alert model J4 manufactured by Alcohol Countermeasures Systems Inc of Mississauga Ontario, Canada. This device has long been marketed for use in preliminary roadside screening by law enforcement officers. The Alert J4 is portable and economical. This breath testing device is more fully described in the U.S. Pat. No. 3,764,270 issued to Collier et al, expressly incorporated herein in its entirety, by reference. As an alternative to the visual display 32, the breath tester 30 may be provided with circuitry capable of transmitting the breath test data or a signal carrying the breath test results directly over the telephone line 18 t the central office 12. Such circuitry may include an output line 36 connected to the picture telephone 20. An adaption of the breath tester 30 described above but having an output in the form of an electrical signal which can be delivered over the output line 36 is described in the U.S Pat. No. 4,093,945 issued to Collier et al, expressly incorporated here in its entirety by reference. In this patent, the breath tester output signal is used to enable an automobile ignition system upon the passing of a test of the sobriety of the driver. In doing this, the internal logic circuitry of the tester performs a threshold test and generates an ignition enabling signal when the BAC from a valid sample measures below a predetermined level. The output signal may instead carry the breath test data in the form, for example, of an analog signal proportional to the BAC, or may carry the test result in the form, for example, of a simple binary signal indicating that the test has been passed or failed. This direct electrical transmission of the breath test to the central office 12 will be more fully described in connection with the other embodiments discussed below.

In this embodiment, visual transmission of either the data or the test results by way of still pictures is employed in part because it is an efficient method generally suitable for communicating information from almost any test. It is also employed in part because it will transmit information needed to verify the identity of the person on whom the test is being performed and will do so over voice quality phone lines. With pictorial information transmission, blood tests, saliva tests, urine tests, other tests on body fluid, and tests of other sorts for determination of compliance with various behavioral conditions of confinement, may be made at the remote confinement location 14 and transmitted to the central office 12

In the embodiment of FIG. 2, a picture telephone 40 is also provided at the central office 12. The picture telephone 40 may be identical to the picture telephone 20 at the remote confinement location 14. The telephone 40 would likewise be commercially equipped with a camera 42, a display screen 44, a two-way audio speaker 46, and a digital key set 48 including a touch tone telephone key board and other push button controls. In the described embodiment of FIG. 2, the camera 42 is not used and may be omitted at the central office picture telephone set 40, since receipt of pictorial information, not its transmission, is what must be accomplished at the central office 12. In the alternative, or in addition, to the use of the screen 44 for the pictorial display, the central office 12 is provided with a printer 50 to print a hard copy of the pictorial image received by the picture telephone 40, thus, making a permanent record for filing or for later analysis.

The central office 12 is further provided with an automatic dialer 54 connected through the telephone line 18, to the phone system 16. The dialer 54 is capable of being activated under the control of a computer to dial the telephone number of a selected one of a plurality of home arrest locations 14. The telephone switching system 16 is used to selectively establish the communications link 13 between the central office 12 and the confinement location 14 at which the selected prisoner is confined The central control office 12 is provided with a computer 60. The computer 60 is programmed to operate the automatic dialer 54 to dial the telephone numbers of specific confinement locations in either a predetermined or random manner. The computer 60 has an output 62 connected to the automatic dialer 54, and another output 64 connected to the picture telephone 40. The output 62 transmits the telephone number signals from the computer 60 to the dialer 54. The output 64 is a cable capable of transmitting information from the picture phone 40 for interpretation by the computer 60, and from the computer 60 to the picture phone 40 to control the functions of the phone 40 or to send information out over the phone lines 18. The computer 60 is provided with a further output 66 connected to the printer 50 to operate the printer 50 in accordance with the computer program.

A further connection 68 is provided to connect the computer 60 with a data bank 70. This data bank 70 may be a disk, tape drive, or other digitized storage medium containing information relating to specific prisoners who are to be monitored. Typically, the data bank 70 will contain lists of the behavioral conditions or terms of probation relating to the prisoners involved in the home incarceration program, the phone numbers of the prisoners which are associated with each of the locations of confinement, and other information such as a digitized reference picture of the prisoner. The digitized reference picture may be called up from data bank 70 by the computer 60 to be either displayed on a screen at the computer 60 for real time comparison by an operator or a computerized image analysis system, with the image from the confinement location 14 which is displayed on screen 44, or it may be transmitted through the output line 66 to the printer 50 and printed out with the image from the picture phone 40 so that the images may be compared with the reference picture from the data bank 70 at a later time.

In some applications, it may be necessary to have an immediate decision made with respect to the compliance of the particular probationer with the confinement conditions. In such a case, it is desirable to have the central office 12 monitored by a full time attendant. The attendant can make a visual comparison of the image on the screen 42 with the image displayed on the screen of computer 60. When immediate decision making is not critical, the need for a full time attendant at the control office 12 is eliminated by printing out the image from the picture phone 40 on printer 50 along with the image from the data bank 70 for subsequent analysis and review.

In the embodiment illustrated in FIG. 2, the system operates preferably with initiation of a sequence at the central office 12. First, under control of the program of the computer 60, a prisoner is selected and a signal containing the phone number of the remote confinement location 14 at which the selected prisoner is confined is sent through the output 62 to the automatic dialer 54. This causes the dialer 54 to dial the location 14 over the conventional telephone lines 18 and through the telephone switching system 16 establishing a communications link 13 with the confinement location to which the particular selected prisoner is incarcerated.

The computer 60 is programmed to require an answer at the confinement location 14. If there is no answer after a predetermined number of tries, the fact that a violation has occurred is either recorded or immediately transmitted to a violations office 72 over an additional output 74. The violations office 72 is used here symbolically to represent the authority assigned to act upon a report of a violation by a prisoner.

If a person answers at the remote confinement location 14, the camera 22 of the picture phone 20 will take an electronic still picture image of the face of the person answering the call or at an announced time delay after the call is answered to allow the specified prisoner time to come to the phone. The picture phone 20 will then transmit the image via the voice quality phone lines 18 to the picture phone 40 at the central office 12. This picture may be immediately compared by an operator viewing the screen 44 and comparing the screen image with the information from the file image, in this case an image called up the data bank 70 by the computer 60 as described above. If the image does not match, a manual decision is made by the operator to either signal the violations office 72 or to make a record of a violation of the behavioral condition for later action, as for example, printing out a message at the printer 50. If the confined prisoner is present a the location 14 and his presence is confirmed, the test of the additional confinement condition, in this case the alcohol breath test, is performed.

In this particular embodiment, the behavioral condition for which the prisoner is being tested is the abstinence from alcoholic consumption. The prisoner is thus, upon answering the central office call, instructed by a signal sent over the phone lines 18 from the central office 12, either by the attendant or by a pre-recorded message from the central office 12, or other cue signal to execute a breath test. The test is accomplished by the operation of the breath tester 30 at the arrest location 14 to test the alcohol blood content of the confined person. Within a certain amount time, either pre-determined by the program 60 or determined by the attendant, the confined person must activate the breath tester 30 by delivering a breath sample into the mouthpiece 34. With respect to typical breath testers such as the type described above, the breath tester 30 is designed to require a sustained air flow of four to five seconds duration in order to deliver a deep lung air sample. Such a sample provides a reliable test for an accurate alcohol blood content reading. The delivery of a proper breath sample is determined by a pressure switch and timing circuitry within the breath tester 30. The pre-existence of a proper sample is required to either activate the display 32 or to generate a signal to the output line 36 to the picture phone 20 for verification by transmission of a signal, over the phone lines 18 to the central office 12, that the breath sample has been delivered.

The five second sampling period allows for at least one other still picture of the prisoner to be taken by the picture telephone 20 while the breath sample is being delivered and transmitted to the central office 12. Typically, picture phones of this type will generate two or three images during the 5 second period. This picture so generated will allow the attendant to verify the identity of the person delivering the breath specimen. This will prevent or at least minimize the likelihood that a person other than the specified prisoner is the source of the breath sample being measured by the breath tester 30. As a further confirmation of the validity of the test, the operator will hear the delivery of the breath sample through the two way speakers 26 and 46 as the picture showing the user is being received.

The LUMA phone described above, for example, includes push button controls to select full, medium or small screen images. The full screen image may require 5 to 8 seconds for transmission, and its higher resolution picture is suitable for the initial prisoner identifying image. The smaller screen images, however, can be transmitted in 2 to 3 seconds with this device and thus they are more suitable for verification of the identity of the tested person. To positively verify that the designated prisoner is the individual who actually delivers the sample, the prisoner is required to send a series of closely spaced freeze frame images showing the prisoner delivering the sample. This is accomplished by selecting the small screen mode of the LUMA phone and having the prisoner push its SEND button at intervals corresponding to the most rapid transmission rate (i.e., 2-3 seconds) during the entire course of sample delivery. To aid the prisoner in the proper timing of pressing the "SEND" button an audible or visual cue such as a tone or light flash signal ma be sent from central office 12 or generated at remote location. This will result in receipt at the central office 12 of a chronological series of closely temporally spaced, freeze frame images at the central office showing the prisoner in the act of sample delivery. If any of the images show a person other than the prisoner or if any of the images are spaced in time far enough that the prisoner could reasonably have enlisted the aid of an accomplice to deliver the sample, regardless of whether the image of the accomplice appears in any image, the test will be invalid and a new test required.

At the end of the breath test, the sample is analyzed automatically by the breath tester 30 and the result in the form of a numerical BAC reading is displayed on the display 32. The digital or analog display 32 will be picked up by a further pictorial image taken by camera 22 and transmitted to the central office 12. This information will also be displayed at the central office 12 through the picture telephone 40 on either screen 44 or the printer 50, and will be analyzed manually or automatically either at the time that it is received or subsequently. If the breath test does not show a reading within the acceptable alcohol blood content level, a violation will be communicated to the violations office 72.

The transmission of information pictorially from the remote confinement location 14 to the central office 12 has the particular advantage of flexibility in the nature of the behavioral condition which may be tested. Any visually readable test result or test data may be transmitted in this way. Changes can be made to existing systems by substituting some other test for the alcohol breath test at any confinement location 14. Thus the same system 10, with the testing devices differing among the various confinement locations 14, may be employed to monitor different confinement conditions for different prisoners at the same time.

The versatility of video displays in accepting a wide variety of read outs from a wide variety of testing devices imposes requirements upon the analysis and the decision making process at the central office 12. The transmission of the test results pictorially, while suitable for most types of tests, is less adaptable to unattended and automatic supervision than alternative embodiments discussed below where real time violation detection is required. Nonetheless, while the illustrated first embodiment employs manual analysis and decision making, automated image comparisons are possible through the use of more sophisticated computers in place of the computer 60. Such embodiments are described elsewhere herein.

The versatility of pictorial information as a carrier of test data or test results in a remote confinement system 10 is shown by its use with purely chemical tests or other tests which are performed without electrical instrumentation. A example of such a test is the Alcoscan Saliva Alcohol Test developed by Lifescan, Inc. of Mountain View, Calif. The test utilizes dry reagent chemistry for the rapid detection of ethanol in saliva. It uses a test strip in which the enzyme alcohol oxidase couples with a dye system to produce an intense color change when in the presence of ethanol. The test strip is furnished with a sealed packet costing less than a few dollars each, and which includes instructions and the necessary materials for a complete, self-contained, self-administerable test.

The Alcoscan Saliva Alcohol Test is performed by the taking of a saliva sample from the mouth of the prisoner onto a clean swab provided with the kit. The sample is then applied to saturate a reagent pad on the test strip. The test strip is then returned to a foil or transparent wrapper for a short reaction period. At the end of the reaction time, a stable color is developed by the test strip which can be visually compared with a color scale printed on the packet. A high BAC in the prisoner produces a very fast reaction. The alcohol oxidase enzyme test is highly specific, reacting only with methanol and ethanol. The kit described is sensitive at levels as low as 0.010% BAC. Distinguishable test strip colors result at the BAC levels of 0.01, 0.05 and 0.10 percent.

When used with the system of the present invention, a chemical reagent test, in the Alcoscan case a specific dry reagent test for alcohol in saliva, will replace the breath tester 30 in the first described embodiment. In the operation of the system, the prisoner will receive instructions or a signal from the central office 12 to perform the reagent test, rather than the breath test, before the camera 22 of the picture phone 20. A picture will be transmitted to verify that the specified prisoner who is the one delivering the saliva test. A subsequent picture transmitted to the central office 12 will communicate the test results.

In order to insure the integrity of the test results where the reaction time is long, as for example, several minutes, the confinement location 14 may be provided with means for immediately securing the test sample when it is delivered. This can be done by providing a receptacle to receive the test strip while the test is before the camera 20, immediately after the sample is given. The receptacle will be fixed in a position viewable by the camera 22. An automatic follow-up call at the end of the reaction time will transmit a picture of the test results. The test samples so verified can be secured and later physically collected for further analysis.

Dry reagent tests, and other reagent tests are available for other substances. A test for marijuana is available in dry reagent test strip form for use on saliva. Tests have been available for determining the presence of other drugs or their degradation products in urine or blood. Some of these tests are specific, some are class sensitive. Most have a very low false detection rate. Systems for detecting a wide variety of drugs in urine or blood are marketed by Syva Company of Palo Alto, Calif. under the trade name Emit Drug Detection Systems. Equipment is also available for performing automated tests on body fluids such as blood and urine. An example are the Cromotographs manufactured by Varian of Sunnyvale, Calif. Where body fluids of any type are tested with the system of the first preferred embodiment of the invention, pictorial information of the prisoner during the delivery of the sample verifies the identity of person from whom the sample is taken.

On the other hand, the breath alcohol test is a very important test and one which is often desired in the context of a remote confinement program. Accordingly, system advantages can be obtained by embodiments of the present invention which are specifically adapted to a specific test such as blood/alcohol breath test developed through the use of a breath tester 30. One such embodiment which does so in the context of a system which makes greater use of automated analysis and decision making is illustrated and described in the second preferred embodiment.

SECOND PREFERRED EMBODIMENT

Figure 3:
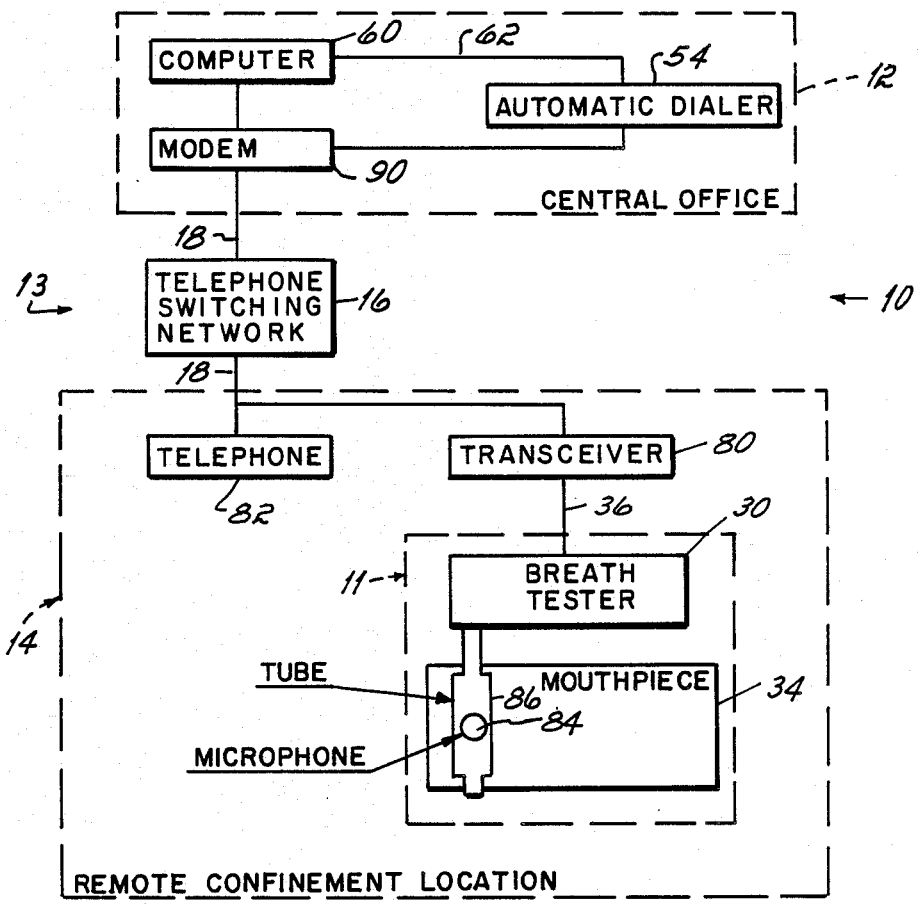
FIG. 3 is a block diagram of a second preferred embodiment of the present invention showing alternative adaptations of a remote confinement system according to the present invention.

FIG. 3 is a diagram of the second preferred embodiment as a present invention. As with the first embodiment, this embodiment is described in the context of the system 10 which employs a central office 12, a remote confinement location 14 which is one of a plurality of such locations, and communications link 13 between the central office 12 and the confinement location 14. The link includes a conventional telephone switching station of the commercial public telephone exchange 16. The connections between the central office 12, the telephone exchange 16, and the confinement locations 14 are voice quality telephone lines 18.

In this embodiment, unlike the embodiment at FIG. 2, pictorial information is not the primary means employed to identify the prisoner and transmit test results, but rather the information is communicated in the form of machine readable electrical signals.

A breath tester 30 in the form of behavioral condition tester 11 is employed at the confinement location 14 to measure the prisoner's BAC. Instead of generating a visually perceivable readout, however, the breath tester 30 is equipped with circuitry for producing an electrical signal containing information from the results of the breath test. This signal is presented at an output terminal 36 of the breath tester 30 which is connected to telephone line 18 through a modem or other telephone transceiver 80 which is capable of transmitting a signal containing digital or analog encoded information of the results or data from a breath test analysis. The transceiver 80 also contains circuitry for detecting and responding to signals from the central office 12, and for implementing an operating sequence. Also connected to phone line 18 may be a telephone unit or modem 80 which may be operated in conjunction with transceiver 82 and to facilitate response to a telephone call over the phone line 18.

In this embodiment, the breath tester 30 contains a microphone 84 which is mounted within or in functional proximity to a breath sampling system 86 to which the mouthpiece 34 of breath tester 30 connects to the breath tester 30. The microphone 84 is electrically connected so as to impose the audio signal either directly from the microphone onto the phone line 18, or indirectly through a network or other circuitry to the phone line 18. The purpose of the microphone 84 is to provide for the taking of a voice sample from the user of the breath testing device 30. The purpose of the voice sample is to derive information through which the user may be identified. The voice information takes the place of some of the visual information in first embodiment described above. This voice information will carry sufficient data to allow for positive identification of the prisoner and constitutes the prisoner identity verifier 15 of the diagram of FIG. 1.

The voice sample will also contain information for verifying that the person delivering the breath sample and the identified prisoner are one in the same That requirement is achieved by the physical placement of the microphone 84 near but preferably within the breath sampling system 86. The voice sample is delivered by the user in the form of speech or as a hum as the breath sample is being given. With the provision for circuit logic within the system 10 to synchronize the reading of the breath and voice samples, it can be assured with reasonable certainty that the samples are being taken from one and the same person.

The microphone 84 and its relation to the mouthpiece 34 described here in connection with this second preferred embodiment may be of the type described from the patent of Joseph P. Hoppesch, U.S. Pat. No. 3,809,067. The particular device shown in the Hoppesch patent was designed specifically to combine the taking of the breath sample with the taking of a voice sample in the course of using the breath tester 30 in order to require that the two samples be given by the same person at the same time. As such, the likelihood that the breath sample and the voice sample would be from different persons, defeating the purpose of the test, will be minimized.

With the embodiment shown in Feature 3, the picture phone 40 in FIG. 2 at the central office 12 is unnecessary. Instead, at the central office 12, the phone line 18 will connect directly through a modem 90 to the computer 60. As with the first embodiment, the automatic dialer 54 is also employed with this system 10 connected in an output line 62 between the computer 60 and either the modem 90 or the telephone line 18 directly. The dialer 54 is symbolically illustrated in the figures. It is also common that such a dialer be physically incorporated into the computer 60 or the modem 90.

Identification of the probationer by voice or by the audio characteristics of the prisoner's hum involves a use of the concept of voice print analysis. This concept is based upon the fact that anatomical differences among individuals result in sound spectra unique to each person, analyses of which will provide for the confirmation of the identity of an unknown speaker when comparison is made of the unknown person's voiceprint with a known voiceprint of the same individual's voice. The concept of voice print analysis is discussed in an article entitled *Voiceprint Identification* by L. G. Kersta of Bell Telephone Laboratories, Murray Hill, N.J. and published in the Dec. 29, 1962 issue of Nature Magazine. The use of voiceprint analysis for remote user identification is described in U.S. Pat. No. 3,525,811 to F. C. Trice et al.

Identification of individuals by voiceprint involves the use of audio spectral analyzers, including hardware and software which has been developed and is available in varying degrees of sophistication, complexity and cost, as the references listed above illustrate. Recent developments in speech recognition for human voice communication with computers has provided more simplified systems which will operate with acceptable reliability to distinguish one speaker from another.

An example of one such system which will identify a probationer by voice or by a hum is the VoiceScribe 1000 Speech Recognition System marketed by Cherry Electronics Division of Cherry Electrical Products Company, Waukegan, Illinois. It includes a printed circuit board and software for IBM and IBM compatible PCs. It has the capability of accepting a vocabulary of words or speech patterns from a particular person and then recognizing them when repeated. The sensitivity of the system can be adjusted to reduce the likelihood of false acceptance or of false rejection, and it can be set to provide acceptable reliability in a remote confinement system.

Another speech recognition system is the TI-Speech System by Texas Instruments. It includes a subsystem called the Ti-Speech Vocabulary Manager & Transparent Keyboard which also functions to memorize speech patterns and sounds and to respond with a command when they are duplicated. This system too is adaptable to discriminating among the speech of different persons. A further speech recognition system which utilizes concepts capable of adaptation to identification of a prisoner by voice is the Kurzweil Voicesystem from Kurzweil Applied Intelligence, Inc. of Los Angeles, Calif.

It is contemplated that the hardware and software components for identifying the prisoner by speech or by a hum made during a delivery of the breath sample will be installed at the computer 60 in the central office 12. In that way the voice profiles of the prisoners can be retrieved from the data bank 70 and compared with the audio signal received at the central office 12 over the phone lines 18 from the remote confinement location 14. The identification is made by conventional methods of correlation of the voice standard with the voice print from the test. The limiting factors are those imposed by the quality of the phone lines 18. Communications networks using higher quality lines, fiber optics, coaxial cable or other wide band transmission lines, or air waves will accommodate a higher signal information density and, accordingly, will facilitate more sophisticated and reliable voiceprint analysis at the central office 12.

Since better audio data will be available for analysis at the remote confinement location 14, before transmission over the phone lines 18 and the deterioration of the signal which that may cause, it is further contemplated that voice print identification will be accomplished, in part at least, by installation of equipment at the remote confinement location 14. Such equipment is rapidly becoming more economical. By the addition of circuitry including filter networks or voice print templates or masks encoded on memory devices to be correlated with and to process the signal before transmission over the phone lines 18, the reliability of the identification of the prisoner by voice analysis can be enhanced. Devices for making an on site correlation of the voice sample with identification criteria are described in U.S. Pat. No. 3,989,896 to H. J. P. Reitbaeck. Such devices can be made tunable or programmable to selectively respond to the voiceprint of only the predetermined prisoner assigned to the specific confinement location 14. With this adaption, the identification decision could be made automatically either with the equipment at the remote location 14 or with that at the central office 12. The identification decision so made would be fully automated, and the need for an attendant at the central office 12 would be reduced or eliminated.

The operation of this second preferred embodiment proceeds in a manner similar to that of the first embodiment described above. The computer 60, together with the dialer 54, causes the central office 12 to connect over the telephone lines 18 through the central office 16 to the selected remote confinement location 14. If there is no answer, a violation is signaled to the violations office 92. If there is an answer, a recorded message or a recognizable signal of some other sort is caused to appear at the confinement location 14 to instruct the prisoner to perform the breath test or whatever test is indicated. In this case, the prisoner must deliver the five second breath sample at the tester 30 and, at the same time, must provide an identifiable sound by humming into the same mouthpiece 34 so that the hum is picked up by the microphone 84 as the breath sample is being taken.

In this embodiment, upon the completion of the test, a signal carrying the information of the prisoner's BAC and of the voice sample delivered at the time of the breath test are analyzed and transmitted to the central office 12. A failure of either the BAC test or the voice print test will be interpreted as a violation and signaled to the violations office 92.

In the alternative or in addition to the voluntarily used breath alcohol tester 30, the use of a device commonly called a "sniffer" is contemplated. Such a device operates to generate an alarm signal when air having a detectable alcohol content comes into contact with the sensor of the device. Sniffers usually contain a small fan to direct air through a fuel cell test chamber. Devices of this type are also manufactured by Lion Laboratories Ltd. of Cardiff, U.K. The use of sniffers is practical where their presence is unknown to the prisoner. They may be concealed in the telephone unit in systems such as this second embodiment where voice tests are being performed. Sniffers are less reliable and more easily circumvented than the breath testers described above, so concealment of the devices is preferred. Because the alcohol us restrictions usually involve total bans on alcohol use in remote confinement systems, the devices inability to quantitatively assess BAC is not a serious shortcoming. Such devices can further be used to detect the likelihood of user circumvention of the tester 30 and to signal that further investigation of a prisoner is in order.

With this embodiment of the invention, the integrity of the breath test sample is maintained with the use of an interrelated sampling technique. This embodiment also produces signals which are reduced to forms which are automatically perceivable by the computer 60 so that violations detection can be made without manual intervention at the central office 12.

The automatic determination of the result of the confinement condition test and the prisoner identification can be done with devices designed to test for conditions other than BAC with a breath tester 30. Electrical outputs from blood or urine analysis equipment can be communicated to the central office 12 in the same manner as the breath test results. Depending on the method of obtaining the test sample, however, alternative methods to a voice print for verifying the identity of the person giving the sample or performing the test may be desirable. For example, the voice print method of identification can be effectively used to insure the integrity of samples given by mouth, such as the breath test described here or saliva tests which might be alternatively desired. With blood tests, however, identification by fingerprints has advantages in being easily adaptable to interrelated sampling techniques. This alternative is more fully discussed in connection with alternative subsystems below As with the first embodiment described above, this second preferred embodiment relies upon data intrinsic to the specific prisoner to identify the prisoner. The visual image of the prisoner's face and his voice are sufficiently unique intrinsic properties of an individual to make identification by those characteristics acceptably reliable. Other intrinsic characteristics of the prisoner, such as fingerprints, can be employed in alternative embodiments of the invention.

The identification of the prisoner may also be accomplished by reliance on factors which are not intrinsic to the prisoner, but rather involve the performance of an identity confirming act by the prisoner. Such an act would involve the exercise of skills or knowledge taught to or otherwise learned or acquired by the prisoner. An example of such acts would include a spoken sequence, a series of physical movements, and handwriting samples. Handwriting, for example, is unique for each person; comparisons of handwriting can be made visually or by pen pressure readouts. A system which provides automated personal identification by handwriting sample delivery is described in U.S. Pat. No. 3,983,535 to Noel M. Herbst et al. Another example of the use of an identity confirming act is that of the third preferred embodiment described below.

THIRD PREFERRED EMBODIMENT

The third preferred embodiment of the present invention is in all respects identical to that of FIG. 3, except that the breath tester 30 is the device disclosed in U.S. Pat. No. 4,738,333 entitled Sobriety Interlock with Unsupervised Confirmation of Operator Identity expressly incorporated here in by reference in its entirety. This embodiment relies for identification of the prisoner of the performance by the prisoner of an identity confirming physical act which cannot be readily learned by most persons without considerable practice. This device, like that of the second embodiment described with reference to FIG. 3, operates to take two interrelated data samples from the prisoner and to generate electrical signals to report the prisoner's BAC and to confirm the prisoner's identity, and in the process of doing so to verify that the breath sample and the prisoner identifying information are from one and the same person.

The breath tester 30 of this embodiment is similar to that of the second embodiment described with reference in FIG. 3 above, except that, instead of the microphone 84 of FIG. 3, the breath tester 30 is equipped with pressure or air volume transducers and related circuitry for developing a signal representing a signature of a modulated breath sequence delivered by the prisoner. The modulated breath sequence is a predetermined sequence of breath pulses which is difficult for a person to learn. It is taught to the prisoner when first placed in remote confinement. It may be, in part, an arbitrary sequence originated by the prisoner. Immediately after the sequence is taught to, or otherwise learned by, the prisoner, the transducer readout is processed through the remote confinement system, and is recorded on a machine readable medium to be incorporated either into the data bank 70 at the central office 12, or into the circuitry of the breath tester 30 or of the transceiver 80 at the confinement location 14, wherever the comparison is to be made.

If the comparison is to be made at the remote confinement location 14, circuitry will be provided in either the test head or an associated control box which will also include means for comparing the modulated breath sequence delivered at the time of the test with the signature stored in the memory device. In the device disclosed in U.S. Pat. No. 4,738,333 the comparison is made with a microprocessor in the control box of the device. In the device disclosed in that application, a control signal is produced and transmitted to the ignition system of an automobile to enable the car to start if the driver passes the sobriety test. This same form of signal can be the test result signal transmitted to the central office 12 as a pass or fail test result which enables the automobile ignition system.

The identifying modulated breath sequence in this embodiment includes a series of pulses blown into the mouthpiece 34 of the breath tester 30. Timing circuitry within the breath test 30 requires that the modulated breath sample be given within a very short time after the sample of breath is delivered for the alcohol test. A short time separation of the tests is necessary so that the alcohol sample cannot be given by another person who will then pass the tester to the prisoner to deliver the code breath sequence. Alternative techniques may be employed to prevent the passage of the breath sampling device from one person to another between delivery of the breath sample and the identity confirming code.

According to other alternatives, a picture telephone 20 as utilized in connection with the first preferred embodiment described in FIG. 2 can be employed. This allows for visual determination of whether the prisoner has passed the breath tester 30 to another person.

This third embodiment eliminates the need for the transmission of raw data and analysis of the data at the central office 12. Accordingly the need for transmission of more information than the voice quality lines 18 can handle will not occur. This is because the decision processing with respect to both the breath alcohol test and the identity confirmation test are performed with the equipment at the confinement location 14. According, only one binary bit of the test result information need be transmitted over the voice quality line 18.

With this third preferred embodiment, the components at the central office 12 are simpler than with the previous systems. They need contain only a automatic dialer 54 and sufficient circuitry and logic to discriminate between a signal indicating that the test has been passed or one indicating if the test has been failed by the prisoner who is called. Either a failure to answer the automatic call or a failure to return the signal indicating that the breath test and identity test has been passed within a prescribed time, 15 seconds for example, from the answering of the call is sufficient to cause the central office to generate a signal to the violations office 92 to signal a violation.

ALTERNATIVE SUB-SYSTEMS

Alternatives t the above described embodiments of the present invention may be devised by substitution of alternative identity verification, or by substitution.

Remote confinement systems currently in use provide for a neck, wrist or anklet transmitter which is locked onto the prisoner confined to remote confinement location 14. The location 14 is equipped with a device 15 for determining the presence of an identified prisoner, which device is a monitoring device which includes a receiver activated in response to a signal over a telephone line 18. The central office 12 is provided with the computer 60, modem 90 and a dialer 54 for dialing the various confinement locations 14 to interrogate the receiver. The presence of the prisoner in the vicinity of the receiver will cause the verification signal to be returned over the telephone lines 18 to the central office 12. The transmitter is a radio frequency transmitter which will transmit a signal of sufficient strength to be detected by the receiver as long as the probationer is in the specified radius of the receiver. Such a system may be incorporated into the embodiments described above to provide substitute or backup identity verification 15.

Figure 4:
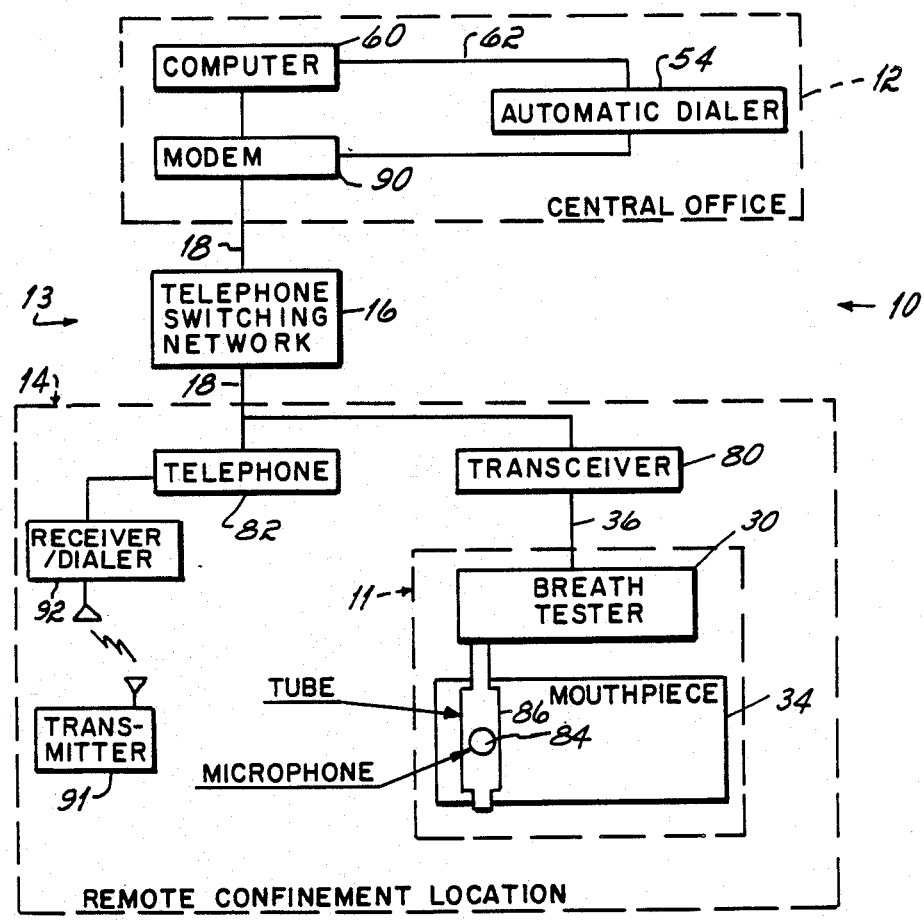
FIG. 4 is a block diagram of a third preferred embodiment of the present invention showing other alternative adaptations of a remote confinement system according to the present invention.

Systems providing an artificially generated signal transmitter to automatically initiate a call from the remote location 14 to the central office 12 may also be employed in cooperation with systems of the present invention. For example, as shown in FIG. 4, a transmitter 91 attached to the prisoner can operate in cooperation with a transmitter and automatic dialer 92 at the remote location 14 to put through a call whenever the possibility that the prisoner has strayed from the confinement location 14. This would cause the equipment at the central office 12 to proceed with the interrogation and testing sequence as described in connection with the embodiments as described above. This adaptation of the system 10 to the use of the transmitter/receiver feature of FIG. 4 can be used in combination with the picture phone 20 of FIG. 2 to detect attempts to generate a false transmitter signal to circumvent the prior art systems employing a transmitter fixed to the prisoner.

Identity verification by the means 15 may be also accomplished in the embodiments described above by equipping the remote confinement location 14 with fingerprint reading devices. In doing so, the fingerprint images may either be read and the data transmitted to the central office 12 where interrupted and compared with images on file for identity verification or may be analyzed at the confinement location by providing the automated fingerprint analysis equipment there.

There are a variety of computer software packages capable of comparing digitized finger prints with file finger prints to reliably determine the identity of the person whose prints are being analyzed. Such systems have been used by national and local law enforcement authorities for some time. In the law enforcement application, a large central data base is provided and digitized finger print images are transmitted by local law enforcement authorities to the central computer for comparison. Such a concept can be adapted o the home incarceration systems described above. In such a system, the prints may be digitized by equipment at the confinement location 14 or transmitted pictorially to the central office 12. The system described in FIG. 2, if provided with optics to modify the picture telephone 20, will effectively transmit a finger print pictorial image to the central office 12 where computerized analysis can be made.

Finger print analysis is also capable of being accomplished by providing equipment at the remote confinement location. This is significantly easier where the fingerprints of the prisoner are to be compared with only one set or a limited number of sets in the file. Such equipment has been developed for computer installations requiring high security and for other secured facilities where a means more reliable than the use of keys, cards, or pass words is required to authorize entry to a facility or to permit user access to the computer. Self contained portable finger print identification devices such as the Ridge Reader manufactured by FingerMatrix Incorporated of North White Plains, N.Y., is one such device. This device contains the circuitry and information necessary to verify the identity of a limited number of individuals and to generate and enabling or disabling signal in response to the finger print verification operation. The use of such a device at a remote confinement location will transmit an identity confirming signal over conventional telephone lines. Accordingly, the simplest of equipment at the central office 12 is required t receive the signal.

Where blood testing on the prisoner is desired, the use of unsupervised blood sampling devices at the confinement location are an option. Devices for use by diabetics are available for the drawing of blood samples by the patient in the home. These devices contain an opening into which the patient inserts a finger, blood is drawn from the finger automatically, and a test is performed to determine the blood sugar level.

In a remote confinement system, a blood sample may be drawn to be analyzed for drugs or alcohol. The analysis may be done immediately or the sample may be drawn and held for future analysis. The time of the taking of the sample and the identity of the person delivering the sample is preserved where future supervised analysis is required. For identification of the person providing a blood sample in such a system, the fingerprint identification technique is suitable, since the print can be taken from the same finger in the same operation as the taking of the blood sample, and the identity of the person providing the sample will be reliably determined.

The systems described above may be provided with devices at the confinement location 14 or performing tests other than a breath test or alcohol on the probationer. Blood test, urine test, and saliva test are also capable of being performed remotely and by testing equipment of various types. Such tests will test for conditions of blood alcohol content or anyone of a large number of prohibited substances which the probationer may have consumed. Body fluids also contain information of discriminating characteristics which can be used to determine prisoner identity. For instance, modern techniques permit testing a wide variety of parameters beyond the traditional A, B, AB and O antigens and Rh factor. It is now possible to test for a sufficiently large number of other genetically determined blood constituents that the probability of identification error can be reduced to an acceptably small percentage. As an indication of the types of tests which can be performed automatically on various body fluids and as reference or the manner in which such test are performed, the following equipment may be considered.

For example, Seva Company of California manufactures a series of automated devices for remotely performing tests on blood and urine. Such devices are manufactured under the name Seva Auto Lab Systems, the emit ST Drug Detection System, and the Seva QST System. These devices will perform a number of tests on blood or urine to determine the presence of barbituates, marijuana, cocaine, alcohol, opiates, and a number of other chemical substances. This line of equipment will analyze blood or urine and generate an analog signal with information relating to the results of the tests. Hewlett Packard Company also produces a number of sophisticated analytical instruments for performing general purpose analysis of blood or urine for substance detection. Whether or not it is economically feasible to perform the test needed in a particular case, body fluid samples of all of these types may be taken, the donor verified by the system, and the specimen screened and saved for future analysis or evidentiary purposes.

Having set forth the principles and described embodiments of the invention, what is claimed is the following:

1. A method for determining from a central office the presence of a specified prisoner at a remote location where the prisoner is in unsupervised confinement, and for ascertaining the prisoner's compliance with a substance abuse restriction, said method comprising the steps of:

performing on a person at the remote location an unsupervised test for the effects of use of the restricted substance;

generating at the remote location a signal carrying information of a result of said test;

generating at the remote location a signal carrying information of the identity of the tested person; and transmitting the generated signals from the remote location to the central office.

2. The method of claim 1 wherein said test performing step includes the step of sampling body fluid of the person being tested and producing a test result, and wherein the test result produced is responsive to the presence of a body fluid component introduced by the tested person's use of the restricted substance.

3. The method of claim 2 wherein said body fluid sampled includes a sample of the exhaled breath from said person.

4. The method of claim 2 wherein said body fluid sampled includes a sample of the saliva from said person.

5. The method of claim 2 wherein said body fluid sampled includes a sample of the urine from said person.

6. The method of claim 2 wherein said body fluid sampled includes a sample of the blood from said person.

7. The method of claim 2 wherein a result of said test performing step is responsive to the alcohol content of said fluid.

8. The method of claim 7 wherein said body fluid sampled includes a deep lung sample of the exhaled breath of said person.

9. The method of claim 7 wherein said body fluid sampled includes a sample of the saliva of said person.

10. The method of claim 9 wherein said test performing step includes the step of reacting said sample of saliva with a reagent.

11. The method of claim 2 wherein said test performing step includes the step of reacting a sample of said body fluid with a reagent.

12. The method of claim 2 wherein said test performing step includes the step of sampling body fluid of the person being tested and the information of the identity of the person tested is information derived from the body fluid sample.

13. The method of claim 1 wherein the information carried by said signals includes pictorial image information of a unique visually identifiable characteristic of the tested person.

14. The method of claim 1 wherein said test performing step includes the step of sampling body fluid of the person being tested and producing a test result from said sample, and wherein the test result produced is responsive to the presence of a body fluid component introduced by the tested person's use of the restricted substance.

15. The method of claim 13 wherein said test result is responsive to the alcohol content of said fluid.

16. The method of claim 15 wherein said body fluid sampled includes a deep lung sample of the exhaled breath of said person.

17. The method of claim 15 wherein said body fluid sampled includes a sample of the saliva of said person.

18. The method of claim 17 wherein said test performing step includes the step of reacting said sample of saliva with a reagent.

19. The method of claim 14 wherein said test performing step includes the step of reacting a sample of said body fluid with a reagent.

20. The method of claim 14 wherein said signal generating steps include generating at the remote location a signal carrying pictorial image information of the sampling of body fluid and of a unique visually identifiable characteristic of the person whose body fluid is being sampled.

21. The method of claim 20 further comprising the step of producing at said remote location a visually perceivable result of said test, and wherein the information carried by said signal includes the pictorial image information of the visually perceivable test result.

22. The method of claim 21 wherein said body fluid sample includes a deep lung sample of the exhaled breath of said person and wherein said test result is responsive to the alcohol content of said fluid.

23. The method of claim 14 further comprising the step of generating at the remote location a signal carrying pictorial image information of the testing of said person and of a unique visually identifiable characteristic of said person.

24. The method of claim 23 further comprising the steps of:
deriving from a signal from said remote location and displaying at said central office a pictorial image of the unique identifiable characteristic of said person;
retrieving from a storage medium at said central office a pictorial image of said specified prisoner; and
comparing said images to determine at said central office the presence of the specified prisoner at the remote location and verifying that the specified prisoner is the person upon whom said test was performed.

25. The method of claim 13 further comprising the steps of:
deriving from a signal from said remote location and displaying at said central office a pictorial image of the unique identifiable characteristic of said person;
retrieving from a storage medium at said central office a pictorial image of said specified prisoner; and
comparing said images to determine at said central office the presence of the specified prisoner at the remote location.

26. The method of claim 25 wherein the unique visually identifiable characteristic and the retrieved image are images of the face of said person.

27. The method of claim 13 wherein the unique visually identifiable characteristic is an image of the face of said person.

28. The method of claim 13 further comprising the step of producing a visually perceivable result of said test, and wherein the information carried by said signals includes the pictorial image information of the visually perceivable test result.

29. The method of claim 13 wherein said pictorial image information is stored at said remote location and is transmitted to said central office in response to a signal from said central office.

30. The method of claim 13 wherein the steps of said method are initiated by a signal from said central office.

31. The method of claim 30 further comprising the initial step of establishing by a signal from said central office a communications link between said central office and said remote location.

32. The method of claim 30 further comprising the step of selectively establishing by a signal from said central office a communications link between said central office and a selected remote location.

33. The method of claim 13 further comprising the step of selectively establishing a telephone communications link between said central office and a selected remote location.

34. The method of claim 33 wherein said signal generating steps are performed with the camera of a picture phone connected to a telephone line at said selected remote location, and said method further comprises the steps of deriving from a signal from said remote location and displaying said image information in pictorial form on the screen of a picture phone connected to a telephone line at said central office.

35. The method of claim 34 further comprising the steps of:
retrieving from a storage medium at said central office a pictorial image of the face of said specified prisoner; and
comparing said pictorial image with pictorial image of the unique identifiable characteristic of said person to determine the presence of the specified prisoner at the remote location.

36. The method of claim 13 for determining the presence of a specified prisoner at a remote location where the prisoner is in unsupervised confinement, and for ascertaining the sobriety of the prisoner while confined, wherein:
said test performing step includes the steps of taking a deep lung sample of exhaled breath of said person and producing a test result from said sample;
the test result produced is responsive to the presence of alcohol in the breath sample;
the unique visually identifiable characteristic is an image of the face of said person;
said signal generating steps are performed with the camera of a picture phone connected to a telephone line at said selected remote location; and
wherein the method further comprises the steps of:
initially establishing from said central office a selective telephone communications link between said central office and a selected remote location;
producing an instrument readout displaying said test result;
generating a signal carrying pictorial image information of the readout and of a unique visually identifiable characteristic of the person providing the breath sample;

deriving from the signal received from said remote location and displaying in pictorial form on the screen of a picture phone connected to a telephone line at said central office a pictorial image face of the tested person and the image of said readout;

retrieving from a storage medium at said central office a pictorial image of the face of said specified prisoner;

comparing at the central office the image of the face of the tested person with the image of the face of the prisoner to determine a said central office the presence of the specified prisoner at the remote location and verifying that the specified prisoner is the person upon whom said breath test was performed; and interpreting the image of the readout of the test to ascertain the sobriety of the specified prisoner.

37. The method of claim 1 wherein said test performing step includes the step of sampling body fluid of the person being tested and wherein said signal generating steps include the step of generating at the remote location a signal carrying pictorial image information of the sampling of body fluid and of a unique visually identifiable characteristic of the person whose body fluid is being sampled.

38. The method of claim 37 wherein said body fluid includes a sample of the exhaled breath of said person.

39. The method of claim 37 wherein said body fluid includes a sample of the saliva from said person.

40. The method of claim 37 wherein said body fluid includes a sample of the urine from said person.

41. The method of claim 37 wherein said body fluid includes a sample of the blood from said person.

42. The method of claim 1 wherein the information of the identity of the person to be tested is information of a unique identifiable characteristic intrinsic to the body of the test person.

43. The method of claim 42 wherein the unique identifiable characteristic is derived from a sample of the voice of the tested person.

44. The method of claim 43 further comprising the step of obtaining the voice sample of the tested person is the form of a sound delivered from the mouth of said person into a tube.

45. The method of claim 44 wherein said testing step includes the steps of sampling through said tube the saliva of the person being tested and producing the test result, and wherein the test result produced is responsive to the presence of a saliva component introduced by the tested person's use of said restricted substance.

46. The method of claim 45 further comprising the step of verifying that the taking of the voice and saliva samples occurs without the removal of the mouth of the person being tested from communication with the tube between the taking of the two samples.

47. The method of claim 44 further comprising the step of sampling said sound with a microphone contained within said tube.

48. The method of claim 44 wherein said testing step includes the steps of sampling through said tube the breath of the person being tested and producing the test result, and wherein the test result produced is responsive to the presence of a breath component introduced by the tested person's use of said restricted substance.

49. The method of claim 48 including the step of verifying that the taking of the voice and breath samples occurs without the removal of the mouth of the person being tested from communication with the tube between the taking of the two samples.

50. The method of claim 49 wherein the steps of taking the voice and breath samples are performed simultaneously.

51. The method of claim 43 wherein the test performing step includes the step of sampling the air in the vicinity of said person for the presence of alcohol.

52. The method of claim 43 including the steps of performing a voice print analysis of the voice sample of the tested person and comparing the results of the analysis with a known voice print of the specified prisoner.

53. The method of claim 52 wherein the comparison includes the use of information processing devices at the remote location.

54. The method of claim 52 further comprising the step of transmitting said voice sample to the central office and performing said voice print analysis and said comparison with information processing equipment located at said central office.

55. The method of claim 52 wherein the steps of said method are initiated by a signal from said central office.

56. The method of claim 55 further comprising the initial step of establishing by a signal from said central office a communications link between said central office and said remote location.

57. The method of claim 55 further comprising the step of selectively establishing by a signal from said central office a communications link between said central office and a selected remote location.

58. The method of claim 55 further comprising the step of selectively establishing a telephone communications link between said central office and a selected remote location.

59. The method of claim 58 wherein said signal generating steps are performed with instruments electrically connected to a telephone line at said selected remote location.

60. The method of claim 59 further comprising the steps of:
obtaining the voice sample of the tested person in the form of a sound delivered from the mouth of said person into a tube;
sampling said sound with a microphone operably disposed in a sound sensing relation with said tube; and wherein:
said testing step includes the steps of sampling though said tube the breath of the person being tested and producing the test result; and
the test result produced is responsive to the presence of a breath component introduced by the tested person's use of said restricted substance.

61. The method of claim 60 including the step of verifying that the taking of the voice and breath samples occurs without the removal of the mouth of the person being tested from communication with the tube between the taking of the two samples.

62. The method of claim 58 further comprising the step of generating an output signal through equipment electrically connected to a telephone line at said central office in response to the test result information received over said phone line at said central office.

63. The method of claim 55 wherein:
said testing step includes the steps of sampling the breath of the person being tested and thereby producing the test result;

said test result produced is responsive to the presence of a breath component introduced by the tested person's use of said restricted substance; and the method further comprises the step of generating an output signal through equipment electrically at said central office in response to the test result information received over said phone line at said central office.

64. The method of claim 52 wherein the method further comprises the step of generating an output signal through equipment at said central office in response to the test result information received over said phone line at said central office.

65. The method of claim 42 further comprising the steps interpreting the signals received at said central office, verifying the identity of the tested person as a result of said interpretation, and generating an output signal through equipment at said central office in response to the verification and to the test result information received at said central office.

66. The method of claim 42 wherein the unique identifiable characteristic is a fingerprint of the tested person.

67. The method of claim 66 further comprising the step of using a fingerprint reading device to read a fingerprint of the person being tested, and wherein said testing step includes the steps of sampling through said device the blood of the person being tested thereby producing the test result, and wherein a test result is produced responsive to the presence of a blood component introduced by the tested person's use of the restricted substance.

68. The method of claim 1 further comprising the steps interpreting the signals received at said central office and as a result, verifying whether the tested person is the specified prisoner and determining whether the specified prisoner is in compliance with a substance abuse restriction, and in response to said verification and determination, generating an output signal through equipment at said central office in response to the verification and to the test result information received at said central office.

69. The method of claim 1 further comprising the initial step of attaching to the specified prisoner a device for generating signal carrying the information of the identity of the tested person.

70. The method of claim 69 further comprising the step of generating at said remote location a signal carrying information for verifying that the signal carrying the information of the identity of the tested person is generated by the device attached to the tested person.

71. The method of claim 69 further comprising the step of detecting the lack of proximity of said device to said remote location and initiating the steps set forth in claim 1 in response to said detection.

72. The method of claim 1 wherein the information of the identity of the tested person is information which includes human intelligence acquired by the specified prisoner and the step of generating said information includes the performance of an identity confirming act by the tested person.

73. The method of claim 72 wherein the acquired human intelligence is modulated breathing sequence and the performance of the identity confirming act includes the step of uttering a modulated breathing sequence sample into a tube at the remote location.

74. The method of claim 73 wherein said test performing step includes the step of sampling through said tube the breath of the person being tested and producing a test result, and wherein the test result produced is responsive to the presence of a breath component introduced by the tested person's use of the restricted substance.

75. A method for determining from a central office the presence of a specified prisoner at a remote location where the prisoner is in unsupervised confinement, and for ascertaining the prisoner's compliance with a behavioral condition associated with said confinement, said method comprising the steps of:

performing at the remote location an unsupervised test for the effects of a violation of the behavioral condition;

obtaining at said remote location information from the performance of said test performing step and generating at the remote location a signal carrying said obtained information;

generating at the remote location a signal carrying information of the identity of a person present at said remote location, said identifying information including pictorial image information of a unique visually identifiable characteristic of said person at said remote location; and transmitting the generated signals from the remote location to the central office.

76. The method of claim 75 further comprising the step of producing at said remote location from said unsupervised test a test result containing information of the presence or absence of effects of a violation of the behavioral condition, and including in said transmitted signals information from said test result.

77. The method of claim 75 wherein the information obtained from said test includes information of whether or not said test performing step has been performed, and said method further comprises the step of verifying from said obtained information whether or not said test performing step has been performed from said obtained information.

78. The method of claim 75 further comprising the steps of:

deriving from a signal from said remote location and displaying at said central office a pictorial image of the unique identifiable characteristic of said person;

retrieving from a storage medium at said central office a pictorial image of said specified prisoner; and comparing said image to determine at said central office the presence of the specified prisoner at the remote location.

79. The method of claim 75 wherein the unique visually identifiable characteristic is an image of the face of said person.

80. The method of claim 75 further comprising the step of producing a visually perceivable result of said test, and wherein the information carried by said signals includes the pictorial image information of the visually perceivable test result.

81. The method of claim 75 wherein said pictorial image information is stored at said remote location and is transmitted to said central office in response to a signal from said central office.

82. The method of claim 75 wherein at least one of the steps of said method are performed in response to a signal initiated from said central office.

83. The method of claim 75 further comprising the step of selectively establishing a telephone communications link between said central office and a selected remote location.

84. The method of claim 75 wherein the behavioral condition is one which, if violated by the prisoner, would produce an effect upon the person of the prisoner, and wherein said test is performed on a person at the remote location for the effects which such violation would cause upon the person of the prisoner.

85. The method of claim 84 wherein said test performing step includes the step of sampling body fluid of said person and producing a test result from said sample.

86. The method of claim 85 wherein said body fluid sampled includes a deep lung sample of the exhaled breath of said person.

87. The method of claim 85 wherein said body fluid sampled includes a sample of the saliva of said person.

88. The method of claim 85 wherein said test performing step includes the step of reacting said sample of body fluid with a reagent.

89. The method of claim 85 wherein said signal generating steps include generating at the remote location a signal carrying pictorial image information of at least a portion of said step of sampling of body fluid.

90. The method of claim 85 further comprising the step of producing at said remote location a visually perceivable result of said test, and wherein the information carried by said signal includes the pictorial image information of the visually perceivable test result.

91. The method of claim 75 further comprising the step of generating at the remote location a signal carrying pictorial image information of the performance of said test performing step.

92. The method of claim 75 wherein said signal generating steps are performed with the camera of a picture phone connected to a telephone line at said selected remote location, and said method further comprises the steps of deriving said pictorial image information at said central office from a signal from said remote location, and then displaying said pictorial image information in pictorial form on a screen of a picture phone connected to a telephone line at said central office.

93. The method of claim 92 further comprising the steps of:
retrieving from a storage medium at said central office a pictorial image of a unique identifiable characteristic of the specified prisoner; and
comparing said pictorial image of the specified with the pictorial image of the unique identifiable characteristic of said person to determine the presence of the specified prisoner at the remote location.

94. A method for determining from a central office the presence of a specified prisoner at a remote location where the prisoner is in unsupervised confinement, and for ascertaining the prisoner's compliance with a behavioral condition associated with said confinement, said method comprising the steps of:
performing at the remote location an unsupervised test for the effects of a violation of the behavioral condition;
obtaining at said remote location information from the performance of said test performing step and generating at the remote location a signal carrying said obtained information of said test;
generating at the remote location a signal carrying information of the identity of a person present at said remote location, said identifying information including information from said person relating to a unique identifiable characteristic intrinsic to the body of said person; and
transmitting the generated signals from the remote location to the central office.

95. The method of claim 94 further comprising the step of producing at said remote location from said unsupervised test a test result containing information of the presence or absence of effects of a violation of the behavioral condition, and including in said transmitted signals information from said test result.

96. The method of claim 94 wherein the information obtained from said test includes information of whether or not said test performing step has been performed, and said method further comprises the step of verifying from said obtained information whether or not said test performing step has been performed.

97. The method of claim 94 wherein the information obtained from said test includes data from said test, and said method further comprises the step of deriving at said central office a test result from said obtained information.

98. The method of claim 94 including the steps of obtaining a voice sample of a person at said remote location and comparing the sample with data related to the voice of the specified prisoner.

99. The method of claim 98 wherein said data is stored at the remote location and the comparison includes the use of information processing devices at the remote location.

100. The method of claim 98 further comprising the step of transmitting said voice sample to the central office and performing said voice print analysis and said comparison with information processing equipment located at said central office.

101. The method of claim 94 further comprising the step of selectively establishing a telephone communications link between said central office and a selected remote location.

102. The method of claim 94 further comprising the steps of interpreting the signals received at said central office, verifying the identity of the tested person as a result of said interpretation, and generating an output signal through equipment at said central office in response to the verification and to the test information received at said central office.

103. The method of claim 94 wherein the unique identifiable characteristic is a fingerprint of the tested person.

104. The method of claim 94 wherein the information carried by said signal is a pictorial image information.

105. The method of claim 104 further comprising the steps of:
deriving from a signal from said remote location and displaying at said central office a pictorial image of the unique identifiable characteristic of said person;
retrieving from a storage medium at said central office a pictorial image of a unique identifiable characteristic of said specified prisoner; and
comparing said images to determine at said central office the presence of the specified prisoner at the remote location.

106. The method of claim 94 wherein at least one of the steps of said method are initiated by a signal from said central office.

107. The method of claim 94 further comprising the step of selectively establishing a telephone communications link between said central office and a selected remote location.

108. The method of claim 107 wherein said signal generating steps are performed with instruments electrically connected to a telephone line at said selected remote location.

109. The method of claim 94 further comprising the steps of:
obtaining a voice sample of said person in the form of a sound delivered from the mouth of said person into a tube;
sampling said sound with a microphone operably disposed in a sound sensing relation with said tube; and wherein said testing step includes the steps of sampling through said tube the breath of said person and producing the test result.

110. The method of claim 109 including the step of verifying that the voice and breath sampling occurs without the removal of the mouth of the person being tested from communication with the tube between the times of the taking of the two samples.

111. The method of claim 94 further comprising the steps of interpreting the signals received at said central office, verifying the identity of the tested person as a result of said interpretation, and generating an output signal through equipment at said central office in response to the verification and to the test verification information received at said central office.

112. The method of claim 94 wherein the behavioral condition is one which, if violated by the prisoner, would produce an effect upon the person of the prisoner, and wherein said test is performed on a person at the remote location for the effects which such violation would cause upon the person of the prisoner.

113. The method of claim 112 wherein said test performing step includes the step of sampling body fluid of said person and producing a test result, and wherein the test result produced is responsive to the presence of a body fluid component.

114. The method of claim 113 wherein said unique identifiable characteristic is derived from said body fluid.

115. The method of claim 113 wherein said fluid is the blood of said person.

116. The method of claim 112 wherein said unique identifiable characteristic is derived from information obtained from said test.

117. A method for determining from a central office the presence of a specified prisoner at a remote location where the prisoner is in unsupervised confinement, and for ascertaining the prisoner's compliance with a behavioral condition associated with said confinement, wherein the prisoner has acquired certain intelligence or skill to learn the performance, in fewer than a predetermined number of attempts, of an identity confirming act requiring a sufficient amount of intelligence or degree of skill so as to be incapable of performance in fewer than the predetermined number of attempts by those not possessing such intelligence or skill, said method comprising the steps of:
performing at the remote location an unsupervised test for the effects of a violation of the behavioral condition;
obtaining at said remote location information from the performance of said test performing step, and generating at the remote location a signal carrying said obtained information of said test;
generating at the remote location a signal carrying information of the identity of a person at said central office which information includes the human intelligence or skill of the type required by the specified prisoner, and the performance by said person of an identity confirming act of a type learned by the specified prisoner; and
transmitting the generated signals from the remote location to the central office.

118. The method of claim 117 wherein the acquired human intelligence is modulated breathing sequence and the performance of the identity confirming act includes the step of delivering a modulated breathing sequence sample into a tube at the remote location.

119. The method of claim 118 wherein said test performance step includes the step of sampling through said tube the breath of the person being tested and producing a test result.

120. The method of claim 117 further comprising the step of producing at said remote location from said unsupervised test a test result containing information of the presence of effects of a violation of the behavioral condition, and wherein said transmitted signal include a signal carrying said information from said test result.

121. The method of claim 117 further comprising the step of verifying from said obtained information whether said test performing step has been performed, and wherein the signal carrying information of said test carries information of the verification of the performance of said test performing step.

122. A method for determining from a central office the presence of a specified prisoner at a remote location where the prisoner is in unsupervised confinement, and for ascertaining the prisoner's compliance with a behavioral condition associated with said confinement, said method comprising the steps of:
performing on the person of a person present at the remote location an unsupervised test for the effects of a violation of the behavioral condition;
generating at the remote location a signal carrying information of said test;
generating at the remote location a signal carrying information of the identity of the tested person;
selectively establishing a telephone communications link between said central office and a selected remote location; and
transmitting the generated signals from the remote location to the central office over said link.

123. The method of claim 122 further comprising the step of producing at said remote location from said unsupervised test a test result containing information of the presence of effects of a violation of the behavioral condition, and wherein said transmitted signals include a signal carrying said information from said test result.

124. The method of claim 122 further comprising the step of verifying from said test information whether said test performing step has been performed, and wherein the signal carrying information of said test carries information of the verification of the performance of said test performing step.

125. The method of claim 122 further comprising the steps interpreting the signals received at said central office and as a result, verifying whether said person is the specified prisoner and determining whether the specified prisoner is in compliance with the behavioral condition, and in response to said verification and determination, generating an output signal through equipment at said central office in response to the verification and to the test information received at said central office.

126. The method of claim 122 further comprising the initial step of attaching to the specified prisoner a device for generating a signal carrying the information of the identity of the prisoner.

127. The method of claim 126 further comprising the step of generating at said remote location a signal carrying information for verifying that the signal carrying the information of the identity of said prisoner is generated by the device attached to said person.

128. The method of claim 122 wherein the prisoner has acquired certain intelligence or skill to learn the performance, in fewer than a predetermined number of attempts, of an identity confirming act requiring a sufficient amount of intelligence or degree of skill so as to be incapable of performance in fewer than the predetermined number of attempts by those not possessing such intelligence or skill, and wherein the information of the identity of said person is information which includes the human intelligence or skill of the type acquired by the specified prisoner and the performance by the tested person of an identity confirming act of the type learned by the specified prisoner.

129. The method of claim 122 further comprising the steps of:
deriving from the signals received from said remote location with equipment connected to a telephone line at said central office the information of the identity of the tested person;
retrieving from a storage medium at said central office information of the identity of said specified prisoner; and
comparing at the central office the derived information with the retrieved information to determine at said central office the presence of the specified prisoner at the remote location.

130. The method of claim 122 comprising the steps of:
deriving from the signals with equipment connected to a telephone line at said central office information from said test; and
interpreting said test information derived at said central office to ascertain the prisoner's compliance with said behavioral condition.

131. A method for determining from a central office the presence of a specified prisoner at a remote location where the prisoner is in unsupervised confinement, and for ascertaining the prisoner's compliance with a behavioral condition associated with said confinement, said condition being of the type which, if violated by the prisoner, will produce an effect on the person of the prisoner which persists subsequent to the violation, said method comprising the steps of:
performing on a person at the remote location an unsupervised test for the effects which a violation of the behavioral condition would produce upon the person of the prisoner;
generating at the remote location a signal carrying information of said test;
generating at the remote location a signal carrying information of the identity of the person upon whom the test was performed; and
transmitting the generated signals from the remote location to the central office.

132. The method of claim 131 wherein said test performing step includes the step of sampling body fluid of the person being tested and producing a test result.

133. The method of claim 132 wherein said body fluid sampled includes a sample of the saliva from said person.

134. The method of claim 133 wherein said test performing step includes the step of reacting said sample of saliva with a reagent.

135. The method of claim 132 wherein said test performing step includes the step of reacting a sample of said body fluid with a reagent.

136. The method of claim 132 wherein said body fluid sampled includes a sample of the urine from said person.

137. The method of claim 132 wherein said body fluid sampled includes a sample of the blood from said person.

138. The method of claim 132 wherein a result of said test performing step is responsive to the alcohol content of said fluid.

139. The method of claim 132 wherein said test signal generating steps include generating at the remote location a signal carrying pictorial image information of the sampling of body fluid.

140. The method of claim 139 further comprising the step of producing at said remote location a visually perceivable result of said test, and wherein the information carried by said signal includes the pictorial image information of the visually perceivable test result.

141. The method of claim 131 further comprising the step of generating at the remote location a signal carrying pictorial image information of the testing of said person.

142. The method of claim 131 further comprising the steps of:
deriving from a signal from said remote location at said central office said information of the identity of said person;
retrieving from a storage medium at said central office information of the identity of said specified prisoner; and
comparing said derived and retrieved information to determine at said central office the presence of the specified prisoner at the remote location and verifying that the specified prisoner is the person upon whom said test was performed.

143. The method of claim 142 further comprising the step of producing a visually perceivable result of said comparison at said central office.

144. The method of claim 131 wherein at least one of said signals is stored at said remote location and is transmitted to said central office in response to a signal from said central office.

145. The method of claim 131 wherein the steps of said method are initiated by a signal from said central office.

146. The method of claim 131 further comprising the initial step of establishing by a signal from said central office a communications link between said central office and said remote location.

147. The method of claim 131 wherein said test performing step includes the step of sampling a body fluid of the person being tested and the information of the identity of the person tested is information derived from the body fluid sample.

148. The method of claim 131 wherein the test performing step includes the step of performing an unsupervised sampling of air in the vicinity of said person.

149. The method of claim 131 wherein the method further comprises the step of generating an output signal through equipment at said central office in response to the test result information received at said central office from said remote location.

150. The method of claim 131 further comprising the steps interpreting the signals received at said central office and as a result, verifying whether the tested person is the specified prisoner and determining whether the specified prisoner is in compliance with said behavioral condition, and in response to said verification and determination, generating an output signal through equipment at said central office in response to the verification and to the test result information received at said central office.

151. The method of claim 131 further comprising the initial step of attaching to the specified prisoner a device for generating signal carrying the information of the identity of the tested person.

152. The method of claim 131 further comprising the step of producing at said remote location from said unsupervised test a test result containing information of the presence or absence of effects of a violation of the behavioral condition, and including in said transmitted signals information from said test result.

153. The method of claim 131 wherein the signal carrying the information obtained from said test includes information of whether or not said test performing step has been performed, and said method further comprises the step of verifying from said obtained information whether or not said test performing step has been performed.

154. A method for determining from a central office the presence of a specified prisoner at a remote location where the prisoner is in unsupervised confinement, and for ascertaining the prisoner's compliance with a behavioral condition unrelated to the presence of the prisoner at the remote location, said method comprising the steps of:

deriving at said remote location information relating to the presence of the prisoner at the remote location;

performing at the remote location an unsupervised test for the effects of a violation, by a person at the remote location, of a behavioral condition unrelated to the presence of the prisoner at the remote location;

generating at the remote location a signal carrying information of said test;

generating at the remote location from said derived information a signal carrying information of the identity of the tested person; and transmitting the generated signals from the remote location to the central office.

155. The method of claim 154 further comprising the step of producing at said location from said unsupervised test a test result containing information of the presence or absence of effects of a violation of the behavioral condition, and including in said transmitted signals information from said test result.

156. The method of claim 154 wherein the signal carrying the information obtained from said test includes information of whether or not said test performing step has been performed, and said method further comprises the step of verifying from said obtained information whether or not said test performing step has been performed.

157. The method of claim 154 further comprising the step of generating at said remote location a pictorial image of said test.

158. The method of claim 154 further comprising the steps of:

deriving from a signal from said remote location at said central office said information of the identity of said person;

retrieving from a storage medium at said central office information of the identity of said specified prisoner; and comparing said derived and retrieved information to determine at said central office the presence of the specified prisoner at the remote location and verifying that the specified prisoner is the person upon whom said test was performed.

159. The method of claim 154 further comprising the step of producing a visually perceivable result of said comparison at said central office.

160. The method of claim 154 wherein at least one of said signals is stored at said remote location and is transmitted to said central office in response to a signal from said central office.

161. The method of claim 154 wherein the steps of said method are initiated by a signal from said central office.

162. The method of claim 154 further comprising the initial step of establishing by a signal from said central office a communications link between said central office and said remote location.

163. The method of claim 154 wherein the test performing step includes the step of performing an unsupervised sampling of air in the vicinity of said person.

164. The method of claim 154 wherein the method further comprises the step of generating an output signal through equipment at said central office in response to the test information received at said central office from said remote location.

165. The method of claim 154 further comprising the steps interpreting the signals received at said central office and as a result, verifying whether the tested person is the specified prisoner and determining whether the specified prisoner is in compliance with said behavioral condition, and in response to said verification and determination, generating an output signal through equipment at said central office in response to the verification and to the test information received at said central office.

166. The method of claim 154 further comprising the initial step of attaching to the specified prisoner a device for generating a signal carrying the information of the identity of the tested person.

167. A remote confinement system comprising:

a central office, a remote confinement location at which a specified prisoner is assigned for unsupervised confinement, means at said remote location for performing an unsupervised test which includes the sampling of a body fluid of a person at the remote location for the effects of a violation of a substance abuse restriction by said person at the location, means at said remote location for generating a signal carrying information of said test, means at said location for generating a signal carrying information of the identity of the tested person; and means for transmitting said signals from said remote location to said central office.

168. A remote confinement system as in claim 167 wherein:

said test performing means includes means for producing a test result from a body fluid sample, the test result produced being responsive to the presence of a body fluid component introduced by the tested person's use of a restricted substance.

169. The system of claim 168 further comprises means for generating at the remote location a signal carrying pictorial image information of at least a portion of said step of sampling body fluid and of a unique visually identifiable characteristic of the person whose body fluid is being sampled.

170. The system of claim 169 wherein the means for producing a visually perceivable test result includes a test instrument having a readout for displaying the result of the test, and wherein said signal generating means includes means for generating pictorial image information of a test result from said readout.

171. A remote confinement system comprising:
a central office,
a remote confinement location at which a specified prisoner is assigned for unsupervised confinement,
means at said remote location for performing an unsupervised test for the effects of a violation of a behavioral condition by a person at the location,
means at said remote location for generating a signal carrying information of said test,
means at said remote location for generating a signal carrying information of the identity of the tested person in the form of a pictorial image information of a unique visually identifiable characteristic of the tested person; and
means for transmitting said signals from said remote location to said central office.

172. The system of claim 171 further comprising:
means at said central office for deriving from the signal received from said remote location and displaying at said central office a pictorial image of the unique identifiable characteristic of said person;
means at said central office for retrieving from a storage medium at said central office a pictorial image of a unique identifiable characteristic of said specified prisoner; and
means at said central office for comparing said images to determine at said central office the presence of the specified prisoner at the remote location.

173. The system of claim 171 wherein the unique visually identifiable characteristics and the retrieved image are images of the face of the person.

174. The system of claim 171 further comprising means for selectively establishing a telephone communications link between said central office and a selected remote location.

175. The system of claim 174 wherein said signal generating means includes the camera of a picture phone and is connected to a telephone line at said selected remote location, and said system further comprises means for deriving from the signal received from said remote location and means for displaying said image information in pictorial form on the screen of a picture phone connected to a telephone line at said central office.

176. The system of claim 175 further comprising:
means at said central office for retrieving from a storage medium at said central office a pictorial image of the face of said specified prisoner; and
means at said central office for comparing said pictorial image with a pictorial image of the unique identifiable characteristic of said person to determine the presence of the specified prisoner at the remote location.

177. The system of claim 171 for determining the presence of a specified prisoner at a remote location where the prisoner is in unsupervised confinement, and for ascertaining the sobriety of the prisoner while confined, wherein:
said test performing means at said remote location includes the means for taking a sample of exhaled breath of said person and producing the test result from said sample;
the test result produced is responsive to the presence of alcohol in the breath sample;
the unique visually identifiable characteristic is an image of the face of said person;
said signal generating means includes a pictorial telecommunications device connectable to a telephone line at said selected remote location; and
wherein the system further comprises:
means at said central office for initially establishing from said central office a selective telephone communications link between said central office and a selected remote location;
means at said remote location for producing an visual display of said test result;
said signal means includes means for generating a signal carrying pictorial image information of the readout and of a visually identifiable characteristic or the person providing the breath sample;
means at said central office for deriving from the signal received from said remote location and displaying in pictorial form on a pictorial telecommunications device connected to a telephone line at said central office an image of the unique identifiable characteristic of the tested person and the image of said display;
means at said central office for retrieving from a storage medium at said central office a pictorial image of the face of said specified prisoner; and
means at said central office for comparing at the central office the image of the unique identifiable characteristic of the tested person with the image of the unique identifiable characteristic of the prisoner to determine at said central office the presence of the specified prisoner at the remote location and verifying that the specified prisoner is the person upon whom said breath test was performed.

178. A remote confinement system comprising:
a central office,
a remote confinement location at which a specified prisoner is assigned for unsupervised confinement,
means at said remote location for performing an unsupervised test for the effects of a violation of a behavioral condition by a person at the location,
means at said remote location for generating a signal carrying information of said test,
means at said remote location for generating a signal carrying information of the identity of the tested person; and
means for transmitting said signals from said remote location to said central office;
the information of the identity of the person to be tested being information of a unique identifiable characteristic intrinsic to the body of the tested person.

179. A remote confinement system comprising:
a central office,
a confinement location remote from said central office at which a specified prisoner is assigned for unsupervised confinement, means at said remote location for performing an unsupervised test for the effects of a violation of a behavioral condition by a person at the location,
means at said remote location for generating a signal carrying information of said test,
means at said remote location for generating a signal carrying information of the identity of the tested person; and
means for transmitting said signals from said remote location to said central office;
said signal generating means including means for deriving information related to a unique identifiable characteristic from a sample of the voice of the tested person.

180. The system of claim 179 further comprising means for performing an automatic voice analysis of the voice sample of the tested person and comparing the results of the analysis with known voice data of the specified prisoner.

181. The system of claim 179 further comprising means at said remote location for storing a voice characteristic of the specified prisoner, means at said remote location for comparing the characteristic derived from the tested person with the known voice characteristic of the specified prisoner.

182. A remote confinement system comprising:
a central office,
a remote confinement location at which a specified prisoner is assigned for unsupervised confinement,
means at said remote location for performing an unsupervised test for the effects of a violation by a person at the location of a behavioral condition relating to the use of a restricted substance,
means at said remote location for generating a signal carrying information of said test,
means at said remote location for generating a signal carrying information of the identity of the tested person; and
means for transmitting said signals from said remote location to said central office,
said testing means including a breath tester for producing a test result responsive to the presence of a breath component introduced by the tested person's use of said restricted substance.

183. The system of claim 180 wherein said breath tester includes a mouthpiece into which the tested person is to deliver a breath sample, said system further comprising means at said remote location for taking a voice sample of the tested person at the mouthpiece, and means for verifying that the taking of the voice and breath samples are delivered by the same person to the mouthpiece.

184. A remote confinement system comprising:
a central office,
a remote confinement location at which a specified prisoner is assigned for unsupervised confinement,
means at said remote location for performing an unsupervised test for the effects of a violation of behavioral condition by a person at the location,
means at said remote location for generating a signal carrying information of said test,
means at said remote location for generating a signal carrying information of the identity of the tested person from information which includes human intelligence or skill acquired by the specified prisoner, means for sensing the performance by the tested person of an identity confirming act of a type learned by the prisoner, wherein the prisoner has acquired certain intelligence or skill to learn the performance, in fewer than a predetermined number of attempts, of an identity confirming act requiring a sufficient amount of intelligence or degree of skill so as to be incapable of performance in fewer than the predetermined number of attempts by those not possessing such intelligence or skill; and
means for transmitting said signals from said remote locations to said central office.

185. The system of claim 184 wherein the identity signal generating means includes means for receiving information from a modulated breathing sequence delivered by a person at said remote location, and said sensing means includes means for deriving identity confirming information from said modulated breathing sequence.

186. A remote confinement system comprising:
a central office,
a remote confinement location at which a specified prisoner is assigned for unsupervised confinement,
means at said remote location for performing an unsupervised test for the effects of a violation of a behavioral condition by a person at the location,
means at said remote location for generating a signal carrying information of said test,
means at said remote location for generating a signal carrying information of the identity of the tested person,
means for transmitting said signals from said remote location to said central office, and wherein
the behavioral condition for which said test is performed is a substance abuse restriction, said signal generating means including means for generating a signal carrying information of the result of said test.

187. The system of claim 186 further comprising means at said central office for receiving signals transmitted from said remote location,
means at said central office for verifying whether the tested person is the specified prisoner and for determining whether the specified prisoner is in compliance with a substance abuse restriction, and means responsive to said verification and determination means for generating an output signal at said central office in response to the verification and to the test result.

188. A remote confinement system comprising:
a central office,
a remote confinement location at which a specified prisoner is assigned for unsupervised confinement,
means at said remote location for performing an unsupervised test for the effects of a violation of behavioral condition by a person at the location,
means at said remote location for generating a signal carrying information of said test,
means at said remote location for generating a signal carrying information of the identity of the tested person; and
means for transmitting said signals from said remote location to said central office;
said test performing means including means for sampling the air in the vicinity of the tested person to detect the presence of alcohol.

189. A remote confinement system comprising:
a central office,
a remote confinement location at which a specified prisoner is assigned for unsupervised confinement, means for establishing a telephone communications link between said central office and said remote location, means at said remote location for performing an unsupervised test on a person at the remote location for the effects on said person of a violation of a behavioral condition by said person, means at said remote location for generating a signal carrying information of said test, means at said remote location for generating a signal carrying information of the identity of the tested person; and means for transmitting said signals from said remote location through said communications link to said central office.

190. The system of claim 189 further comprising means for interpreting the signals received at said central office, means for verifying the identity of the tested person as a result of said interpretation, and means for generating an output signal through equipment at said central office in response to the verification and to the test verification information received at said central office.

191. The system of claim 189 wherein said remote confinement location is one of a plurality of confinement locations which include said remote confinement location, and wherein:

said communications link establishing means includes means at said central office for selectively establishing said link with a selected one of said plurality confinement locations.

192. The system of claim 191 wherein said communications link establishing means comprises:

electronic storage means for storing a plurality of telephone numbers corresponding to respective plural remote locations including the remote location at which said specified prisoner is confined, and means for dialing a telephone number of the selected remote location from a number stored in said storage means.

193. The system of claim 192 wherein said dialing means is an automatic telephone dialer connected to said storage means and to a telephone link at said central office.

194. The system of claim 192 wherein said communications link establishing means further comprises a programmed machine for selecting said telephone number from said stored plurality according to predetermined criteria.

195. The system of claim 194 wherein said system comprises:

a data storage medium at said central office for storing identifying information for a plurality of prisoners including said specified prisoner, and wherein:

said programmed machine is programmed to retrieve the stored identifying information of the specified prisoner along with the selection of said telephone number.

196. The system of claim 191 further comprising:

means at said selected remote location for initiating the operation of said test performing means and said signal generating means in response to the establishment of said link.

197. The system of claim 189 further comprising:

means at said central office for initiating the operation of said test performing and signal generating means.

198. The system of claim 189 wherein said test performing means includes means for sampling body fluid of the person being tested.

199. The system of claim 189 wherein said signal generating means includes a camera and the information carried by said signals is pictorial image information.

200. The system of claim 189 further comprising:

means at said central office for deriving from the signal received over said telephone link from said remote location said information of the identity of said person;

means at said central office for retrieving from a storage medium at said central office information of the identity of said specified prisoner; and means at said central office for comparing said identity information to determine at said central office the presence of the specified prisoner at the remote location.

201. The system of claim 189 wherein said test performing means includes means for producing a test result indicating the presence or absence of said effects, and wherein said information of said test includes said test result.

202. The system of claim 189 wherein said information of said test result includes data from said test.

203. The system of claim 189 wherein said information of said test includes information of whether or not said test performing step has been performed.

204. A remote confinement system comprising:

a central office, a remote confinement location at which a specified prisoner is assigned for unsupervised confinement, means at said remote location for performing an unsupervised test on a person at said remote location for those effects on said person which a violation of a behavioral condition would produce on the person of the prisoner which would persist subsequent to the violation, means at said remote location for generating a signal carrying information of said test, means at said remote location for generating a signal carrying information of the identity of the tested person; and means for transmitting said signals from said remote locations to said central office.

205. The system of claim 204 further comprising means for interpreting the signals received at said central office, means for verifying the identity of the tested person as a result of said interpretation, and means for generating an output signal through equipment at said central office in response to the verification and to the test verification information received at said central office.

206. The system of claim 204 wherein said test performing means includes means for producing a test result indicating the presence or absence of said effects, and wherein said information of said test includes said test result.

207. The system of claim 204 wherein said information of said test includes data from said test.

208. The system of claim 204 wherein said information of said test includes information of whether or not said test performing step has been performed.

209. The system of claim 204 wherein said testing means includes means for sampling body fluid of the person being tested.

210. The system of claim 209 wherein said testing means includes means for testing said body fluid for an effect caused by said violation.

211. The system of claim 204 wherein said test performing means includes means for sampling air in the vicinity of said person at the remote location for the effects of said violation on the body of said person.

212. A remote confinement system for determining the presence of a specified prisoner at a remote location at which the prisoner is in unsupervised confinement and for ascertaining the prisoner's compliance with a behavioral condition unrelated to the prisoner's presence at the remote location, said system comprising:
a central office,
a remote confinement location at which a specified prisoner is assigned for unsupervised confinement,
means at said remote location for deriving information relating to the presence of the specified prisoner at said remote location,
means at said remote location for performing an unsupervised test for the effects of a violation by a person at the location of a behavioral condition unrelated to the presence of the presence of the prisoner at said remote location,
means at said remote location for generating a signal carrying information of said test,
means at said remote location for generating from said derived information a signal carrying information of the identity of the tested person; and
means for transmitting said signals from said remote location to said central office.

213. The system of claim 212 wherein said test performing means includes means for producing a test result indicating the presence or absence of said effects, and wherein said information of said test includes said test result.

214. The system of claim 212 wherein said information of said test includes data from said test.

215. The system of claim 212 wherein said information of said test includes information of whether or not said test performing step has been performed.

216. The system of claim 212 further comprising means for interpreting the signals received at said central office, means for verifying the identity of the tested person as a result of said interpretation, and means for generating an output signal through equipment at said central office in response to the verification and to the test verification information received at said central office.

* * * * *

UNITED STATES PATENT AND TRADEMARK OFFICE
CERTIFICATE OF CORRECTION

PATENT NO. : 4,843,377
DATED : June 27, 1989
INVENTOR(S) : Kip L. Fuller, et al.

It is certified that error appears in the above-identified patent and that said Letters Patent is hereby corrected as shown below:

Col. 8, line 62, "ar" should be --are--.

Col. 11, line 15, "t" should be --to--.

Col. 13, line 31, "a" should be --at--.

Col. 15, line 15, "A" should be --An--.

Col. 19, line 46, "us" should be --use--.

Col. 21, line 66, "t" should be --to--.

Col. 22, line 56, "o" should be --to--.

Col. 23, line 18, "t" should be --to--.

Col. 25, line 3, "claim 1" should be --claim 13--.

Col. 25, line 10, "claim 13" should be --claim 14--.

Col. 27, line 11, "a" should be --at--.

Col. 27, line 43, "is" should be --in--.

Col. 30, line 47, "image" should be --images--.

Col. 33, line 67, "required" should be --acquired--.

Col. 34, lines 10 and 11, "performance" should be --performing--.

UNITED STATES PATENT AND TRADEMARK OFFICE
CERTIFICATE OF CORRECTION

PATENT NO. : 4,843,377

DATED : June 27, 1989

INVENTOR(S) : Kip L. Fuller, et al.

It is certified that error appears in the above-identified patent and that said Letters Patent is hereby corrected as shown below:

Col. 34, line 18, "signal" should be --signals--.

Col. 35, line 36, "the" should be --said--.

Col. 39, line 3, "comprises" should be --comprising--.

Col. 39, line 45, "characteristics" should be --characteristic--.

Col. 41, line 45, "claim 180" should be --claim 182--.

Col. 44, line 46, "locations" should be --location--.

Signed and Sealed this

Twenty-second Day of September, 1992

*Attest:*

DOUGLAS B. COMER

*Attesting Officer*  Acting Commissioner of Patents and Trademarks